United States Patent
Van Den Bossche et al.

(10) Patent No.: US 9,962,641 B2
(45) Date of Patent: May 8, 2018

(54) FILTER ELEMENTS WITH END CAP FEATURES; ELEMENT SUPPORT ASSEMBLY; AND METHODS

(71) Applicant: Donaldson Company, Inc., Minneapolis, MN (US)

(72) Inventors: Thomas Van Den Bossche, Korbeek-Lo (BE); Erwin Jean Marie Verbelen, Meise (BE)

(73) Assignee: Donaldson Company, Inc., Minneapolis, MN (US)

( * ) Notice: Subject to any disclaimer, the term of this patent is extended or adjusted under 35 U.S.C. 154(b) by 0 days. days.

(21) Appl. No.: 15/129,717

(22) PCT Filed: Apr. 2, 2015

(86) PCT No.: PCT/US2015/024140
§ 371 (c)(1),
(2) Date: Sep. 27, 2016

(87) PCT Pub. No.: WO2015/153906
PCT Pub. Date: Oct. 8, 2015

(65) Prior Publication Data
US 2017/0173512 A1    Jun. 22, 2017

Related U.S. Application Data

(60) Provisional application No. 61/975,475, filed on Apr. 4, 2014.

(51) Int. Cl.
*B01D 46/00* (2006.01)
*B01D 46/42* (2006.01)
(Continued)

(52) U.S. Cl.
CPC ..... *B01D 46/0005* (2013.01); *B01D 46/0021* (2013.01); *B01D 46/2414* (2013.01);
(Continued)

(58) Field of Classification Search
CPC B01D 46/00; B01D 46/0005; B01D 46/0021; B01D 46/2414; B01D 46/4227;
(Continued)

(56) References Cited

U.S. PATENT DOCUMENTS

| | | | |
|---|---|---|---|
| 4,171,963 | A | 10/1979 | Schuler |
| 4,199,334 | A | 4/1980 | Berkhoel |

(Continued)

FOREIGN PATENT DOCUMENTS

| | | |
|---|---|---|
| CN | 1311708 A | 9/2001 |
| CN | 1447711 A | 10/2003 |

(Continued)

OTHER PUBLICATIONS

International Search Report and Written Opinion for PCT/US2015/024140, dated Nov. 19, 2015.

*Primary Examiner* — T. Bennett McKenzie
(74) *Attorney, Agent, or Firm* — Merchant & Gould P.C.

(57) ABSTRACT

A yoke arrangement is provided including three leg assemblies connected together to releasably mount a filter assembly to a tube sheet. The filter assembly can include a filter element having a first end cap that acts as a spring. The filter assembly can have filter elements with end caps having built in end stops to prevent over-compression.

11 Claims, 20 Drawing Sheets

(51) Int. Cl.
B01D 46/52 (2006.01)
B01D 46/24 (2006.01)

(52) U.S. Cl.
CPC ....... B01D 46/4227 (2013.01); B01D 46/521 (2013.01); *B01D 2265/027* (2013.01); *B01D 2275/201* (2013.01)

(58) Field of Classification Search
CPC ............ B01D 46/521; B01D 2265/027; B01D 2265/201
USPC .................................................. 55/490–519
See application file for complete search history.

(56) References Cited

U.S. PATENT DOCUMENTS

| | | | |
|---|---|---|---|
| 4,262,403 A | 4/1981 | Wilhelm et al. | |
| 4,323,376 A | 4/1982 | Rosenquest | |
| 4,498,914 A | 2/1985 | Ericksen | |
| 4,557,738 A | 12/1985 | Menasian | |
| 4,565,555 A | 1/1986 | Menasian | |
| 4,767,427 A | 8/1988 | Barabas et al. | |
| 4,775,469 A | 10/1988 | Zimmerly | |
| 5,062,872 A | 11/1991 | Williams | |
| 5,261,934 A | 11/1993 | Shutic et al. | |
| 5,342,433 A | 8/1994 | Avondoglio | |
| 5,599,364 A | 2/1997 | Hawkins | |
| 5,746,796 A | 5/1998 | Ambs et al. | |
| 5,803,941 A | 9/1998 | Berkhoel et al. | |
| 5,895,510 A | 4/1999 | Butler et al. | |
| 5,954,849 A * | 9/1999 | Berkhoel ........... B01D 46/0004 55/498 |
| 6,368,386 B1 | 4/2002 | Nelson et al. | |
| 6,368,388 B1 | 4/2002 | Kosmider et al. | |
| 6,676,721 B1 | 1/2004 | Gillingham et al. | |
| 7,344,577 B2 | 3/2008 | Berkhoel | |
| 8,070,848 B2 | 12/2011 | Cosgrove | |
| 8,956,434 B2 | 2/2015 | Vanderlinden et al. | |
| 2004/0103626 A1 | 6/2004 | Warth et al. | |
| 2007/0151231 A1* | 7/2007 | Rinaldi ................. F01N 3/0211 60/286 |
| 2007/0214758 A1* | 9/2007 | Modesto ........... B01D 46/0004 55/498 |
| 2010/0326024 A1 | 12/2010 | Vanderlinden | |
| 2011/0265434 A1* | 11/2011 | Polizzi ............... B01D 46/0021 55/385.1 |
| 2013/0255208 A1 | 10/2013 | Zhang et al. | |

FOREIGN PATENT DOCUMENTS

| | | |
|---|---|---|
| CN | 101422676 A | 5/2009 |
| DE | 102004021180 A1 | 11/2005 |
| DE | 202007011096 U1 | 12/2008 |
| EP | 1391232 A1 | 2/2004 |
| EP | 1882510 A1 | 1/2008 |
| EP | 2647415 A1 | 10/2013 |
| GB | 2454306 A | 5/2009 |
| WO | 02/16007 A2 | 2/2002 |

* cited by examiner

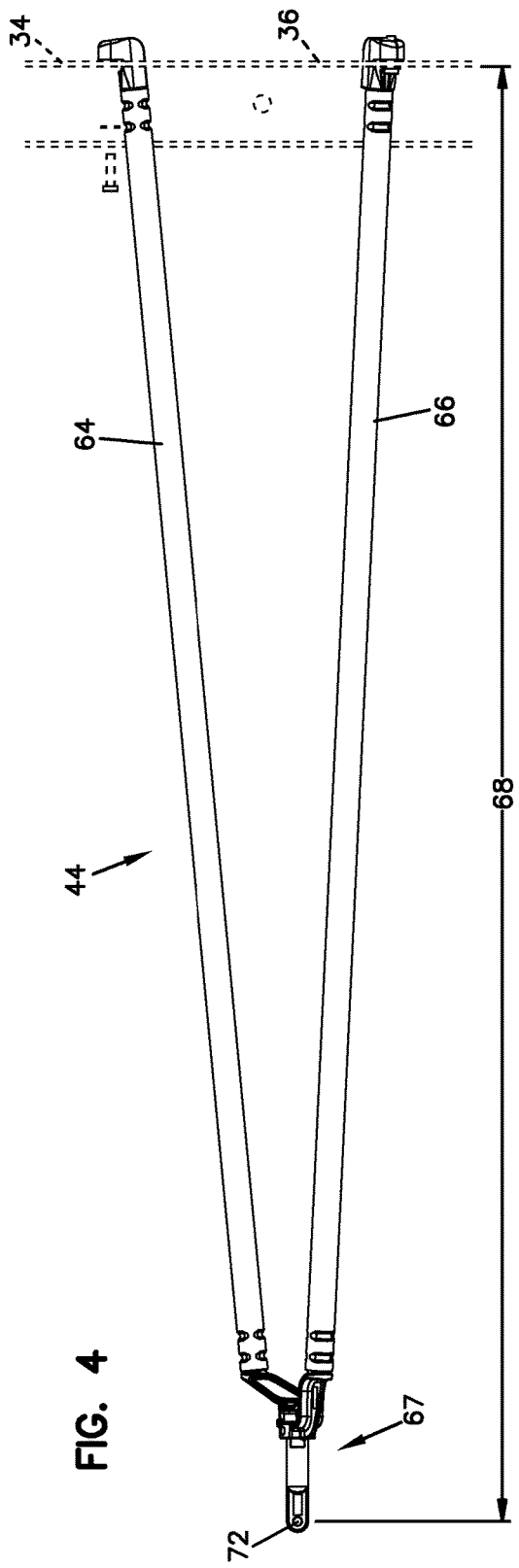
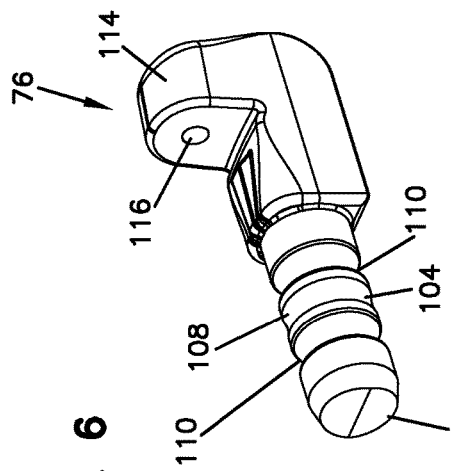
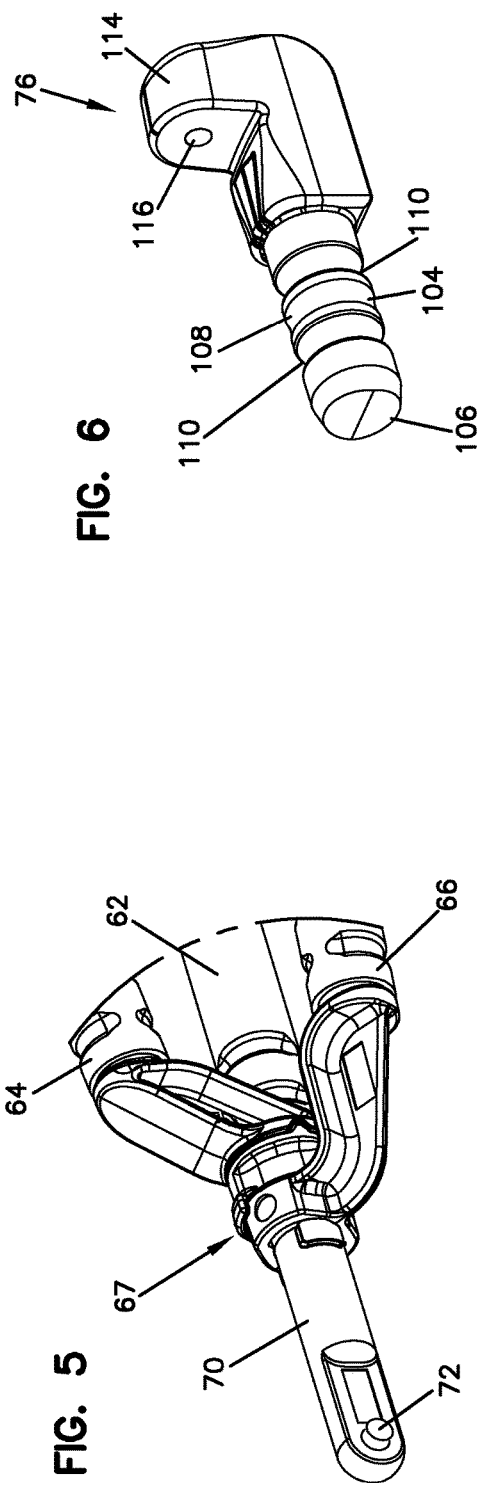

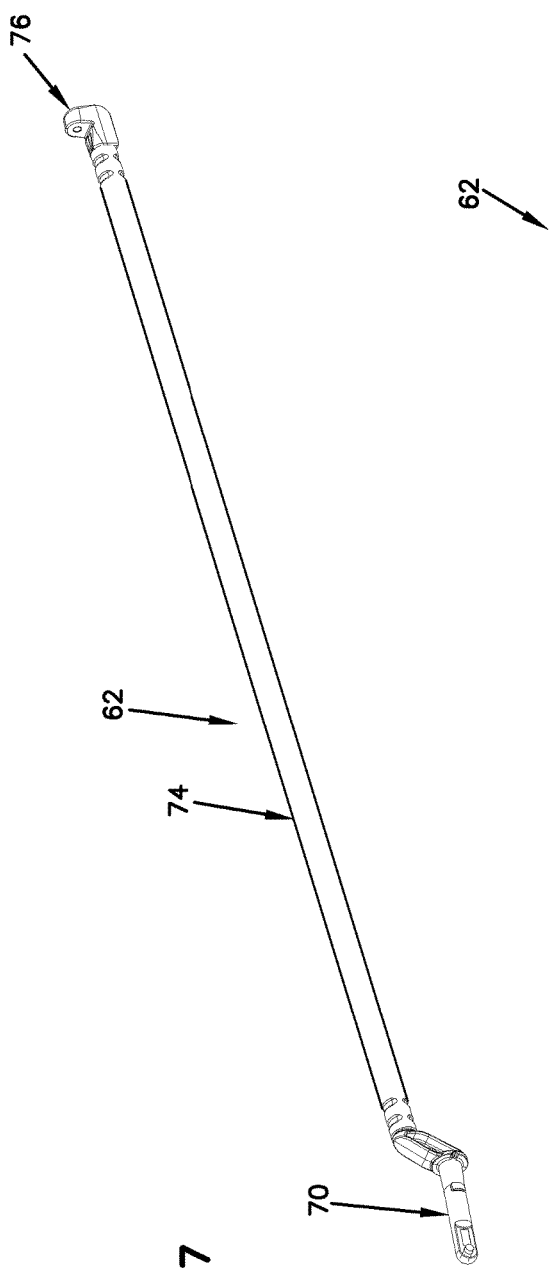
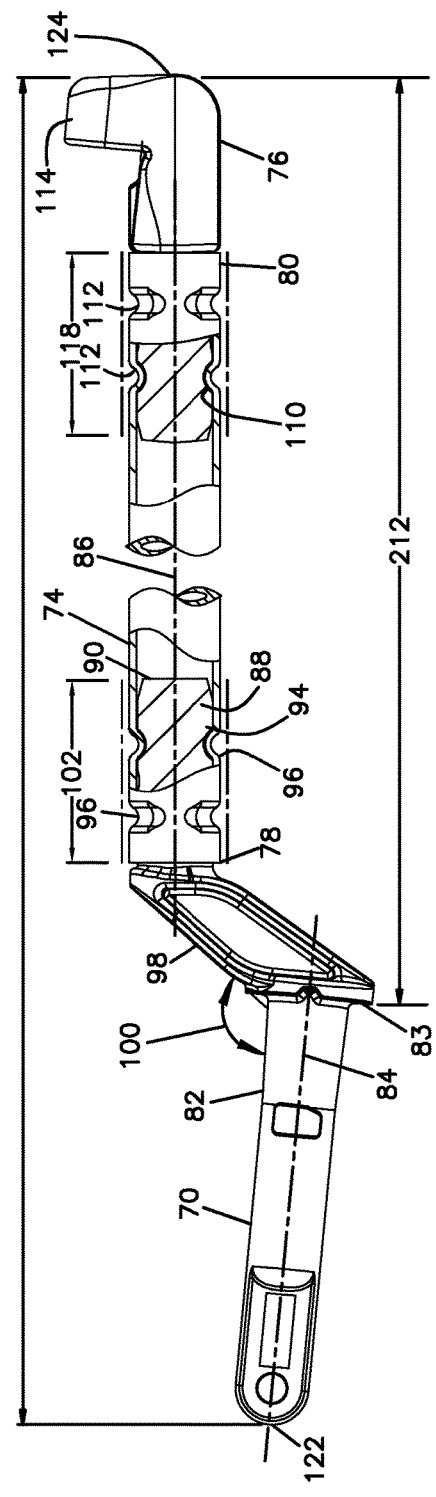
FIG. 7
FIG. 8

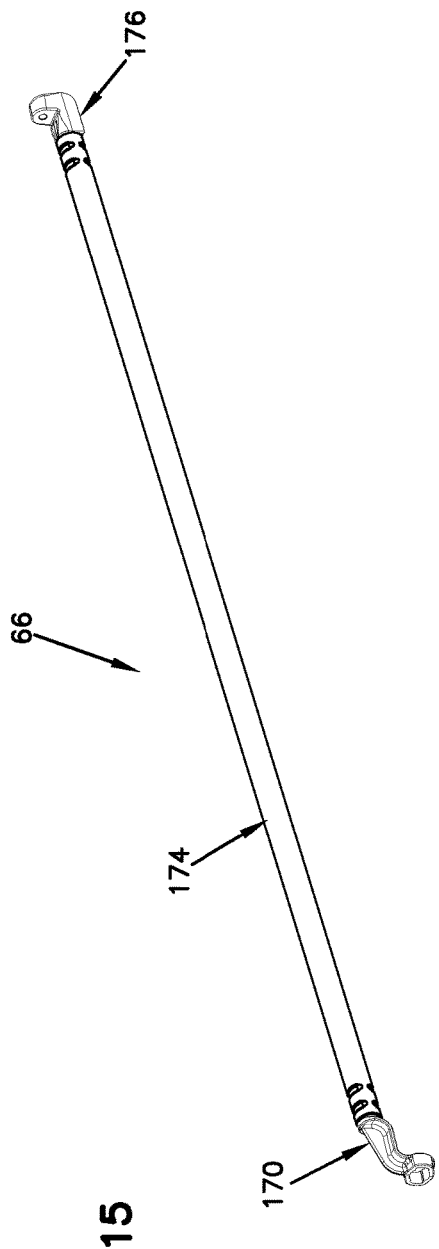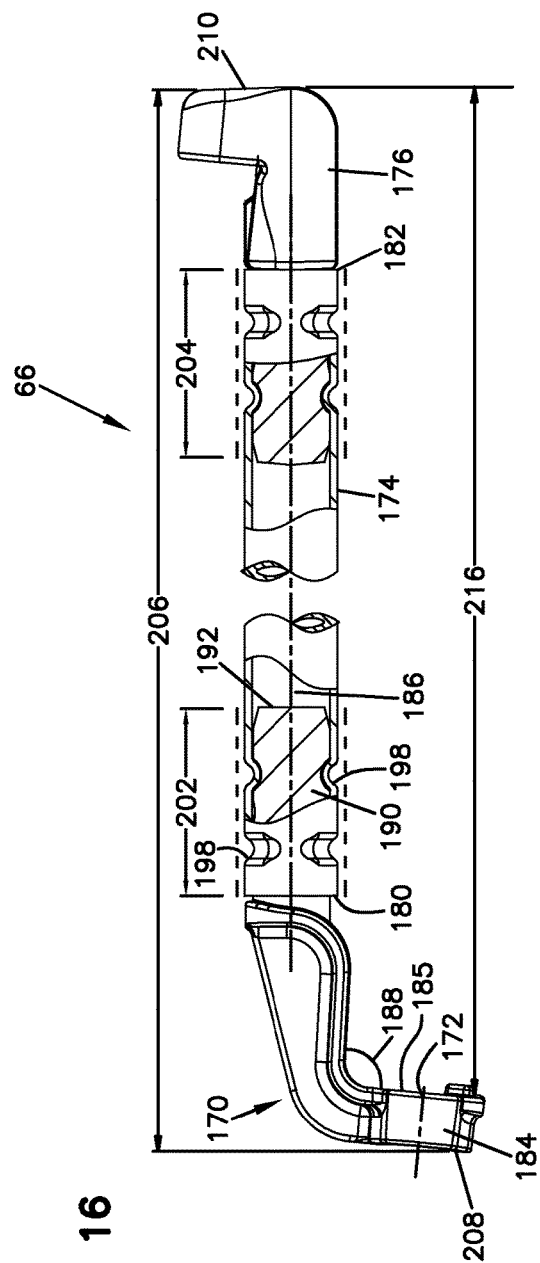
FIG. 15
FIG. 16

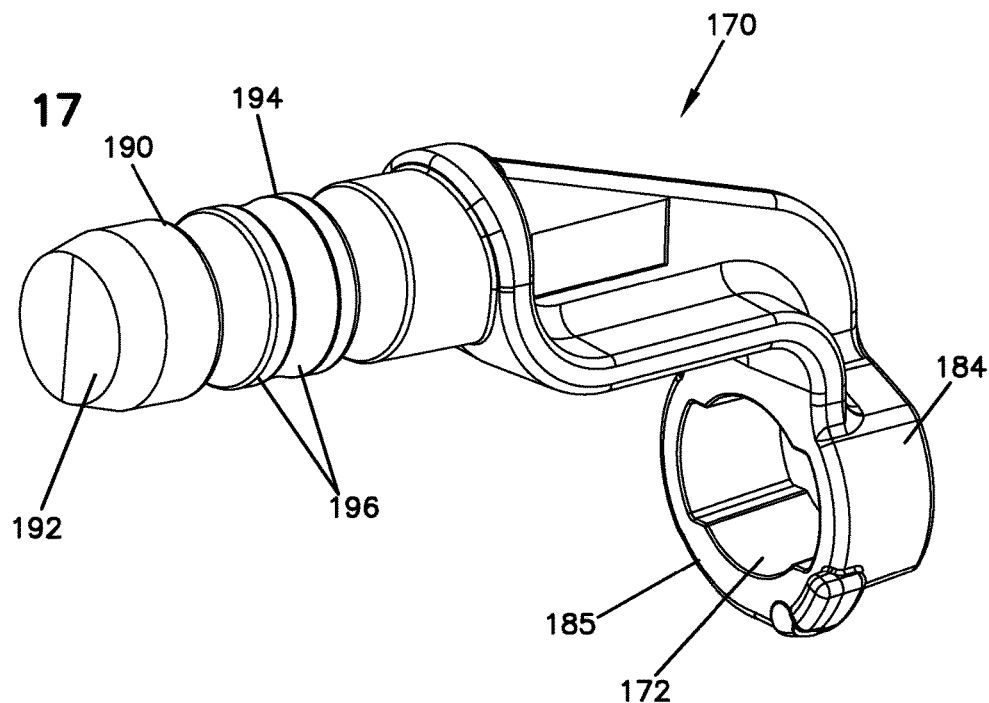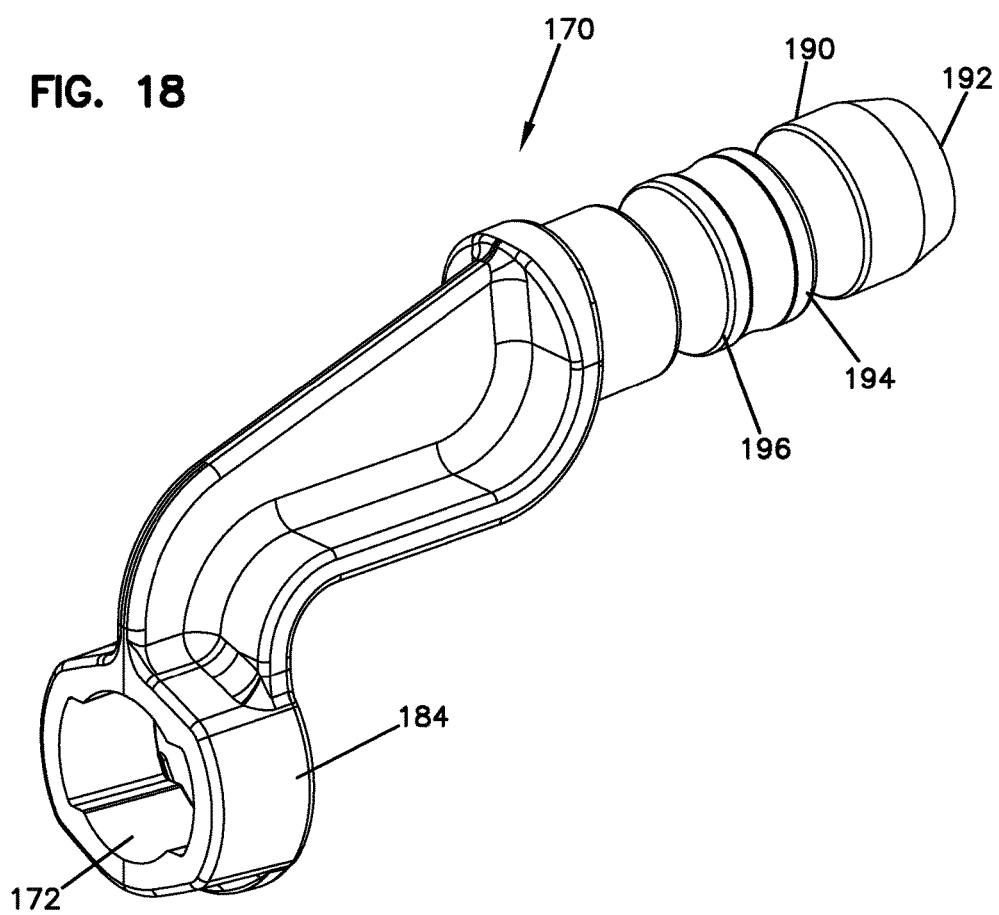

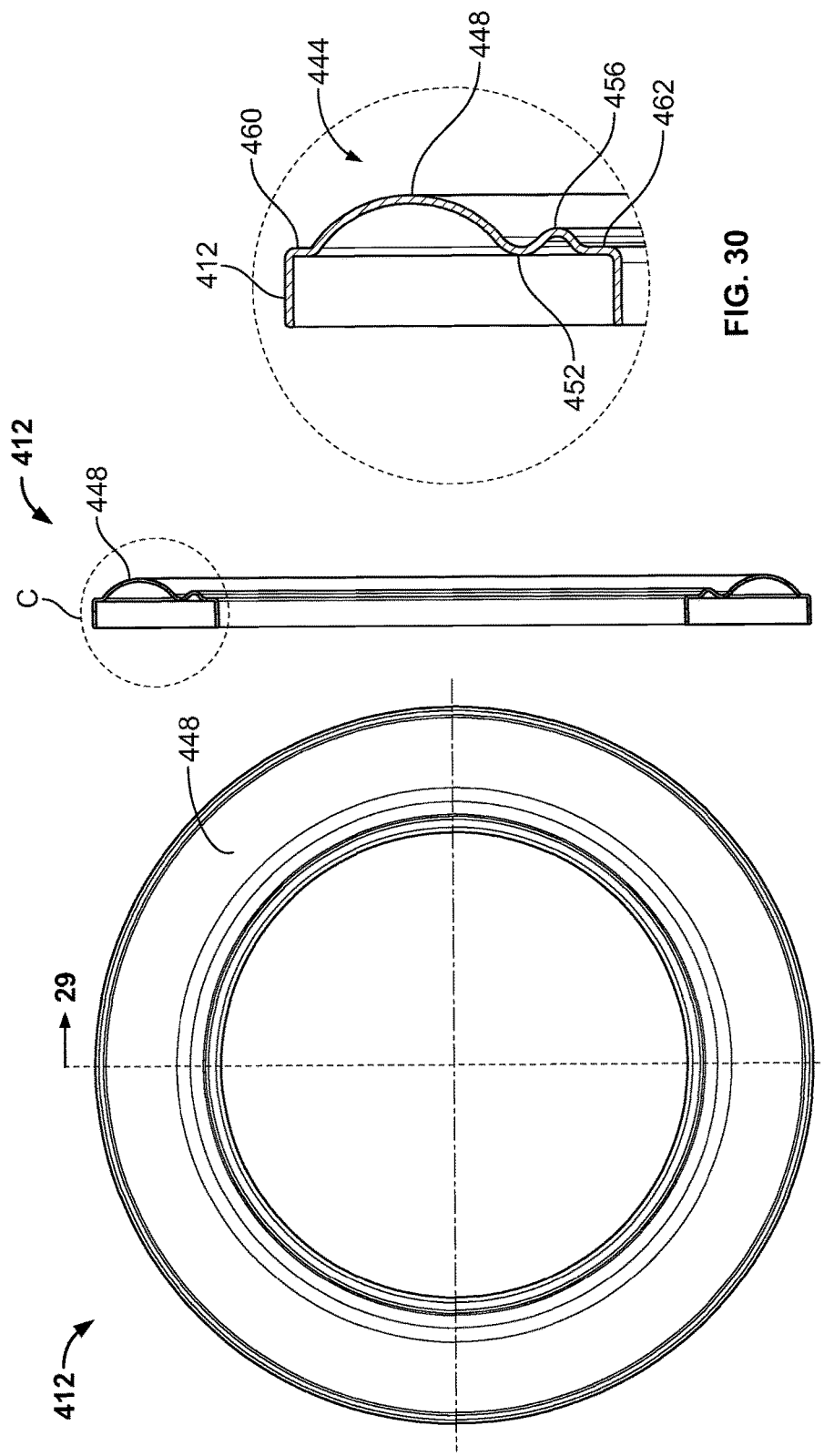

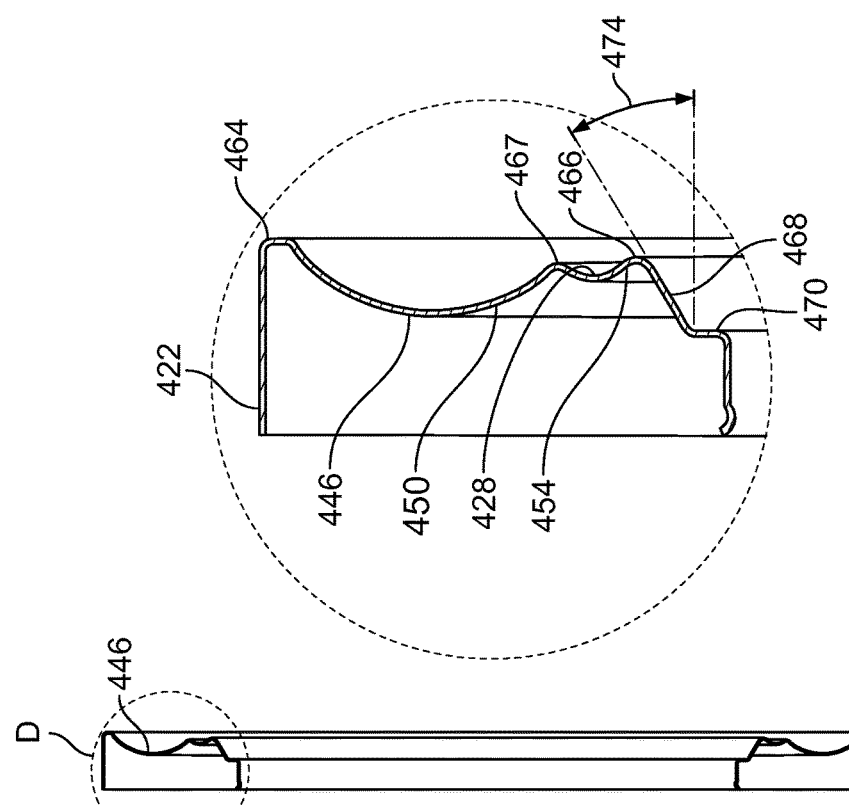
FIG. 33
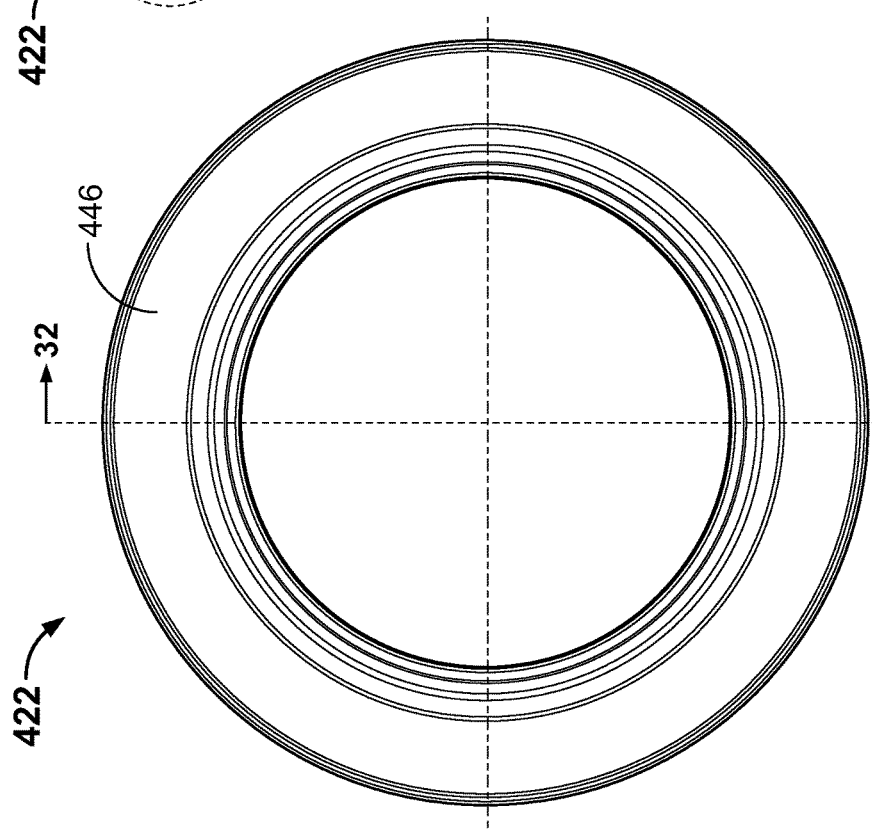
FIG. 32
FIG. 31

FILTER ELEMENTS WITH END CAP FEATURES; ELEMENT SUPPORT ASSEMBLY; AND METHODS

This application is a US National Stage application of PCT International Patent application No. PCT/US2015/024140, filed Apr. 2, 2015, and claims priority to U.S. Provisional patent application Ser. No. 61/975,475, filed Apr. 4, 2014, which applications are incorporated herein by reference. To the extent appropriate, a claim of priority is made to each of the above applications.

TECHNICAL FIELD

This disclosure concerns filters for use in air intakes for gas turbines, dust collectors, industrial compressors, and other systems using filters. In particular, this disclosure concerns a spring end cap used in a filter element; filter elements having additional end cap features; support assemblies for filter elements; and methods for filters used in these systems.

BACKGROUND

Air intake for gas turbines, dust collectors, and other systems such as industrial compressors require filtration of the air so as to not damage internal components to the equipment.

Filters used in such equipment can be mounted and supported in a variety of ways, including a yoke system. One such yoke system is described in WO 2011/005438, incorporated herein by reference. What is needed are systems and methods to improve the prior art.

In addition, when a filter assembly (e.g., a filter pair arranged end-to-end) is operably assembled and mounted to a tube sheet with a yoke arrangement having a nut and washer, usually a seal is created between engaging end caps of the filter pair. In addition, a seal is created between the element next to the tube sheet and the tube sheet. In normal operation, the force applied to the nut and washer translates into a force through the yoke arrangement and ultimately forms the seals between the element pairs and between the tube sheet and the adjacent element. The seals frequently are formed by gaskets. Compression on the gaskets can be influenced by the weather, and the condition of the gaskets. Over time, the force applied through the yoke arrangement can decrease. In addition, in cold weather, more force is needed on the yoke arrangement in order to get effective seals formed. What is needed is an improvement to address the problem caused by ineffective seals due to weather and time.

SUMMARY

A yoke arrangement for releasably mounting a filter assembly to a tube sheet is provided. The arrangement includes a first leg assembly, a second leg assembly, and a third leg assembly.

The first leg assembly has a clamp rod, first element support, and first foot constructed and arranged for releasable attachment to a tube sheet. The second leg assembly includes a second leg holding rod, second element support, and second foot constructed and arranged for releasable attachment to a tube sheet. The second leg holding rod is configured to hold the clamp rod. The third leg assembly includes a third leg holding rod, third element support, and third foot constructed and arranged for releasable attachment to a tube sheet. The third leg holding rod is configured to hold the clamp rod.

The second leg holding rod may include a second rod aperture, in which the clamp rod extends through the second rod aperture.

The third leg holding rod may include a third rod aperture, in which the clamp rod extends through the third rod aperture.

The second leg holding rod and third leg holding rod may be oriented against each other holding the clamp rod.

The clamp rod may include a projection arranged to engage a release handle.

The first leg assembly, second leg assembly, and third leg assembly may be arranged in a tripod arrangement. For example, the first leg assembly, second leg assembly, and third leg assembly may increase in circumferential spacing relative to each other from the holding rod to the first foot, second foot, and third foot.

A portion of the clamp rod may be laterally spaced from the first element support.

The clamp rod portion can have a longitudinal axis angled relative to the first element support.

The second leg holding rod can have a portion laterally spaced from the second element support.

The second leg holding rod portion can define the second rod aperture.

The third leg holding rod can have a portion laterally spaced from the third element support.

The third leg holding rod portion can define the third rod aperture.

Each of the first foot, second foot, and third foot can have a toe generally perpendicular to a remaining portion of the first foot, second foot, and third foot. Each toe can define a fastener-receiving aperture.

The first filter element support may comprise a first tube, and the clamp rod can include a connecting end sized and constructed to be received by the first tube.

The first foot can include a foot connecting and sized and constructed to be received by the first tube at an opposite end of the first tube from the clamp rod.

The second element support may comprise a second tube. The second end holding rod can include a connecting end sized and constructed to be received by the second tube.

The second foot can include a foot connecting end sized and constructed to be received by the second tube at an opposite end of the second tube from the second end holding rod.

The third element support can comprise a third tube, and the third leg holding rod may include a connecting end size and constructed to be received by the third tube.

The third foot can include a foot connecting end sized and constructed to be received by the third tube at an opposite end of the third tube from the third leg holding rod.

A filter assembly can be releasably mounted to a tube sheet using the yoke arrangement as characterized above.

The filter assembly may include at least a first tubular filter element having an open interior, with the yoke arrangement being in the open interior.

The filter assembly can include an end cover on the first filter element, the clamp rod extending through an aperture in the end cover.

The filter assembly can include a release handle connected to the clamp rod and being moveable between a first position bearing against the end cover and a second position released from the end cover.

The filter assembly may include a second tubular filter element having an open interior, the second filter element being axially aligned with the first filter element. The yoke arrangement can be in the open interiors of both the first filter element and second filter element.

The first foot, second foot, and third foot can be secured to the tube sheet.

In another aspect, a method of assembling a yoke arrangement is provided. The method includes providing a first leg assembly having a clamp rod, first element support, and first foot constructed and arranged for releaseable attachment to a tube sheet. The method can include providing a second leg assembly having a second leg holding rod, second element support, and second foot constructed and arranged for releasable attachment to a tube sheet. There may be the step of securing the second leg holding rod to the clamp rod. The method can include providing a third leg assembly having a third leg holding rod, third element support, and third foot constructed and arranged for releasable attachment to a tube sheet. The method can include securing the third leg holding rod to the clamp rod.

In some example methods, the step of securing the second leg holding rod to the clamp rod includes orienting the clamp rod through an aperture in the second rod.

The step of securing the third leg holding rod to the clamp rod can include orienting the clamp rod through an aperture in the third rod.

In another aspect, a filter element is provided. The filter element includes a tubular extension of filter media forming an open filter interior. A first end cap is secured to the filter media. The first end cap has an aperture for receiving a yoke arrangement. The first end cap is constructed and arranged to act as a spring when force is applied from the yoke arrangement.

In some example aspects, the first end cap includes an outer rim; a first flat section adjacent to the outer rim; an extending wall adjacent to the first flat section and extending into the open filter interior, the first flat section being between the extending wall and the outer rim; and a center section recessed relative to the wall as viewed from the filter interior, in an unstressed state, and attached to the extending wall with a rounded joint, the center section defining the aperture.

In many systems, the first end cap comprises steel.

The filter element may further include a second, open end cap secured to the filter media at an end opposite of the first end cap.

A filter assembly may be provided comprising the filter element, as characterized above, in which the filter element comprises a first filter element. The filter assembly further includes a second filter element axially aligned with the first filter element; a tube sheet; and a yoke connecting the first filter element and second filter element together and to the tube sheet.

In example embodiments, the filter assembly has a yoke with three legs, each leg having a foot releasably mounted to the tube sheet.

In some embodiments, the yoke may include a rod extending from a top of the three legs and through the aperture in the first end cap; and a nut and washer assembly engaging the rod to put an axial force on the yoke to press the filter assembly against the tube sheet a form a first seal between the first and second elements; and a second seal between the second element and the tube sheet.

In some embodiments, the yoke can include a first leg assembly having a clamp rod, first element support, and first foot constructed and arranged for releasable attachment to the tube sheet; a second leg assembly having a second leg holding rod, second element support, and second foot constructed and arranged for releasable attachment to the tube sheet; the second leg holding rod configured to hold the clamp rod; and a third leg assembly having a third leg holding rod, third element support, and third foot constructed and arranged for releasable attachment to the tube sheet; the third leg holding rod configured to hold the clamp rod.

In another aspect, a spring end cap for use with a filter element is provided. The end cap can include an outer rim; a first flat section adjacent to the outer rim; an extending wall adjacent to the first flat section and extending into the open filter interior; the first flat section being between the extending wall and the outer rim; and a center section recessed relative to the wall as viewed from the filter interior, in an unstressed state, and attached to the extending wall with a rounded joint, the center section defining the aperture.

The spring end cap may comprise steel.

The spring end cap of center section may be attached to the extending wall at a rounded joint.

The center section may include a first surface extending from the rounded joint sloping in a direction away from extending wall and toward the first flat section to a radiussed valley.

The center section can include a second surface extending from radiussed valley in a direction away from first surface and away from the first section until reaching the center aperture.

In another aspect, a filter element is provided including a tubular extension of filter media forming an open filter interior; and a first end cap secured to the filter media; the first end cap being constructed and arranged to act as a spring when an external force is applied.

In example embodiments, the first end cap includes an outer rim; a first flat section adjacent to the outer rim; an extending wall adjacent to the first flat section and extending into the open filter interior; the first flat section being between the extending wall and the outer rim; and a center section recessed relative to the wall as viewed from the filter interior, in an unstressed state, and attached to the extending wall with a rounded joint.

In example embodiments, the center section defines an aperture.

In example embodiments, the center section is attached to the extending wall at a rounded joint.

In some examples, the center section includes a first surface extending from the rounded joint sloping in a direction away from extending wall and toward the first flat section to a radiussed valley.

In example embodiments, the center section includes a second surface extending from radiussed valley in a direction away from first surface and away from the first section until reaching a center aperture.

The first end cap can comprise steel.

The filter element, in some examples, may further comprise a second, open end cap secured to the filter media at an end opposite of the first end cap.

A filter assembly is provided that may include a filter element as characterized above, and the filter element is a first filter element. The assembly further comprises a second filter element axially aligned with the first filter element; a tube sheet; and the first filter element and second filter element being connected together and to the tube sheet.

In some arrangements, the first element and second element are connected together and connected to the tube sheet with a yoke.

In example embodiments, the yoke includes a rod extending through an aperture in the first end cap; and a nut and washer assembly engaging the rod to put an axial force on the first end cap.

In some examples, the yoke includes three legs, each leg having a foot releasably mounted to the tube sheet.

In some examples of the filter assembly, the yoke includes a first leg assembly having a clamp rod, first element support, and first foot constructed and arranged for releasable attachment to the tube sheet; a second leg assembly having a second leg holding rod, second element support, and second foot constructed and arranged for releasable attachment to the tube sheet; the second leg holding rod configured to hold the clamp rod; and a third leg assembly having a third leg holding rod, third element support, and third foot constructed and arranged for releasable attachment to the tube sheet; the third leg holding rod configured to hold the clamp rod.

In another aspect, a filter assembly is provided including a first filter element having a first tubular section of filter media and at least a first open end cap at one end of the first tubular section of filter media. A second filter element having a second tubular section of filter media and at least a second open end cap at one end of the second tubular section of filter media is also provided. The first and second filter elements are coaxially aligned, and the first open end cap opposes the second open end cap. One of the first and second open end caps has a projecting gasket, and the other of the first and second open end caps has a gasket-receiving surface. The first and second end caps have an end stop arrangement that engages to prevent over-compression of the gasket, responsive to a force compressing the first and second filter elements against each other.

The end stop arrangement comprises a projection-receiver assembly, with one of the first and second open end caps having a projection, and the other of the first and second open end caps having a receiver oriented to receive the projection and provide a stop surface when the first and second filter elements are compressed against each other.

In one or more embodiments, the projection includes an arcuate projection member on the first open end cap and extending at least 50% of the radial length of the first open end cap. The receiver includes an arcuate dish on the second open end cap sized to receive the arcuate projection member.

In example embodiments, one of the first and second open end caps has a cup, with the projecting gasket being mounted in the cup. The other of the first and second open end caps has a groove with the gasket-receiving surface oriented and sized to receive and engage the projecting gasket.

In example embodiments, the first open end cap has the cup oriented adjacent to the arcuate projection member, and the second open end cap has the groove oriented adjacent to the arcuate dish.

In one or more example embodiments, the arcuate projection member and the arcuate dish are positioned radially further from an interior volume of the first and second filter elements than the cup and groove.

In example embodiments, the second filter element includes a third open end cap at an end of the second filter element opposite of the second open end cap. The third open end cap includes a second projecting gasket and a second end stop arrangement. The second end stop arrangement prevents over-compression of the second projecting gasket, responsive to a force compressing the second filter element against a tube sheet.

In example embodiments, the third open end cap includes a trough recessed in a wall arrangement. The trough holds the second projecting gasket. The wall arrangement may comprise the second end stop arrangement.

In example embodiments, the first filter element may include a spring end cap, as previously characterized herein, at an end of the first filter element opposite of the first open end cap.

The filter assembly may include a yoke assembly in an interior volume of the first and second filter elements and constructed and arranged to compress the first and second filter elements against each other.

In another aspect, a method of installing a filter assembly against a tube sheet is provided. A yoke assembly will be secured to the tube sheet. The method includes mounting a first filter element and a second filter element over the yoke assembly. Next, there is a step of engaging the yoke to compress the projecting gasket into the gasket-receiving surface until the end stop arrangement is engaged to prevent over-compression of the projecting gasket. The first filter element and second filter element may include filter elements as previously characterized herein.

The method may also include, while engaging the yoke, compressing the second projecting gasket against the tube sheet until the second end stop arrangement engages against the tube sheet to prevent over-compression of the second projecting gasket.

It is noted that not all these specific features described herein need to be incorporated in an arrangement for the arrangement to have some selected advantage according to the present disclosure.

BRIEF DESCRIPTION OF THE DRAWINGS

FIG. 4 is a cross sectional view showing the yoke arrangement and a portion of the tube sheet, the cross section being taken along the line B-B of FIG. 3;

FIG. 5 is an enlarged, perspective view of detail C, depicted in FIG. 3;

FIG. 6 is a perspective view of a foot that is used to attach the yoke arrangement to the tube sheet in FIG. 3;

FIG. 7 is a perspective view of a first leg assembly of the yoke arrangement of FIG. 3;

FIG. 8 is an enlarged, side view, partially in cross section, of the first leg assembly of FIG. 7;

FIG. 15 is a third leg holding rod used in the yoke arrangement of FIG. 3;

FIG. 16 is an enlarged, side view, partially in cross section, of the third leg assembly of FIG. 15;

FIG. 17 is a perspective view of a third leg holding rod used in the third leg assembly of FIGS. 15 and 16;

FIG. 18 is another perspective view of the third leg holding rod of FIG. 17;

FIG. 28 is an end view of an end cap of one of the filter elements shown in FIG. 25;

FIG. 29 is a cross-sectional view of the end cap, taken along the line 29-29 of FIG. 28;

FIG. 30 is an enlarged cross-sectional view of section C of FIG. 29;

FIG. 31 is an end view of one of the end caps of one of the filter elements of the assembly of FIG. 25;

FIG. 32 is a cross-sectional view of the end cap of FIG. 31, the cross-section being taken along the line 32-32 of FIG. 31;

FIG. 33 is an enlarged cross-sectional view of section D of FIG. 32;

DETAILED DESCRIPTION

A. The Embodiment of FIGS. 1-18

Figure 1:
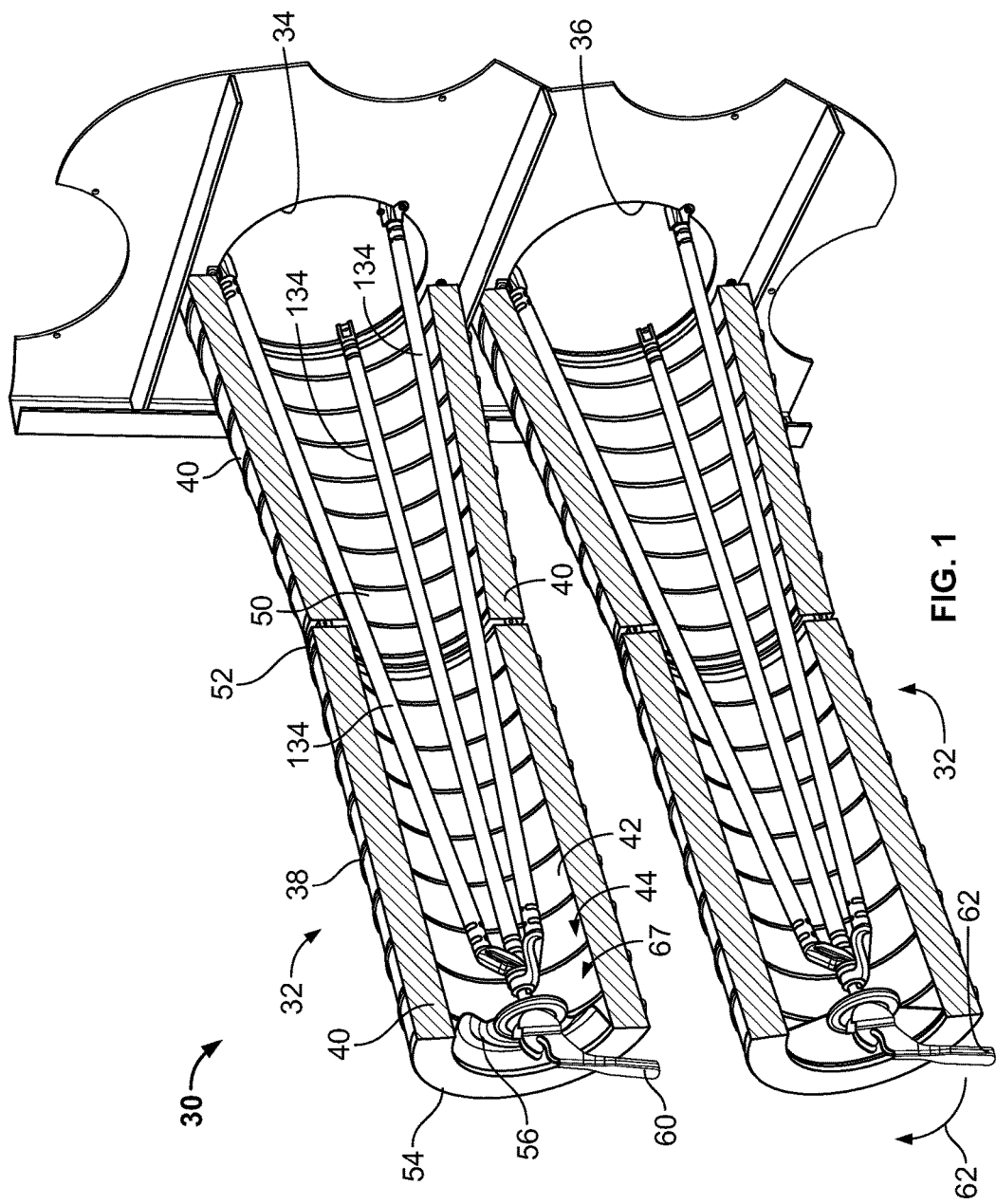
FIG. 1 is a schematic, perspective, cross sectional view of a pair of filter assemblies mounted to a tube sheet using a yoke arrangement constructed in accordance with principles of this disclosure.

FIG. 1 depicts a schematic, cross sectional view of a portion of an air intake system 30 for a gas turbine, for example. It should be understood that the air intake system could also be used in a dust collector, compressor system, or in other systems.

The system 30 includes a plurality of filter assemblies 32 releasably mounted to a tube sheet 34. In the particular example depicted, there are two filter assemblies 32 shown. It should be understood that in many typical systems, there can be many, many more filter assemblies 32.

The tube sheet 34 includes a plurality of tube sheet apertures 36. The filter assemblies 32 are releasably mounted to the tube sheet 34 over the apertures 36 such that air entering the system 30 will pass through the filter assemblies 32 and then through the tube sheet aperture 36. After passing through the tube sheet aperture 36, the air is directed to downstream equipment, such as a gas turbine. The air may also be directed to further downstream filters.

Still in reference to FIG. 1, each filter assembly 32 may include at least a first filter element 38. The first filter element 38 includes a tubular extension of filter media 40 defining an open filter interior 42 therein. While many different types of media are usable, in many typical systems, the filter media 40 will include pleated media, such as pleated cellulose media, which may or may not be further treated with fine fibers.

The first filter element 40 is releasably connected to the tube sheet 34 with a yoke arrangement 44. The yoke arrangement 44 extends through the open filter interior 42, and releasably attaches the first filter element 38 to the tube sheet 34. By the term "yoke arrangement" or "yoke", it is meant a clamp or similar piece that embraces two parts to hold or unite them in position. In the examples depicted herein, the yoke arrangement 44 embraces at least the first filter element 38 and the tube sheet 34 to unite them in position. As explained below, in further examples, the yoke arrangement 44 embraces the first filter element 38 and a second filter element 46 and the tube sheet 34 to unite them in position.

In the arrangement shown, the filter assembly 32 further includes a second filter element 46. The second filter element 46 is axially aligned with the first filter element 38, such that they have a common longitudinal axis. The second filter element 46 has a tubular extension of filter media 48 defining an open filter interior 50 therein. In this example, the tubular extension of media 48 is conical in shape, such that the circular cross section of the open filter interior 50 becomes larger as it extends from the end 52 in engagement with the first filter element 38 to the tube sheet 34.

As can be seen in FIG. 1, the yoke arrangement 44 extends in both open filter interiors 42, 50 to releasably mount the first filter element 38 and second filter element 46 to the tube sheet 34.

Figure 2:
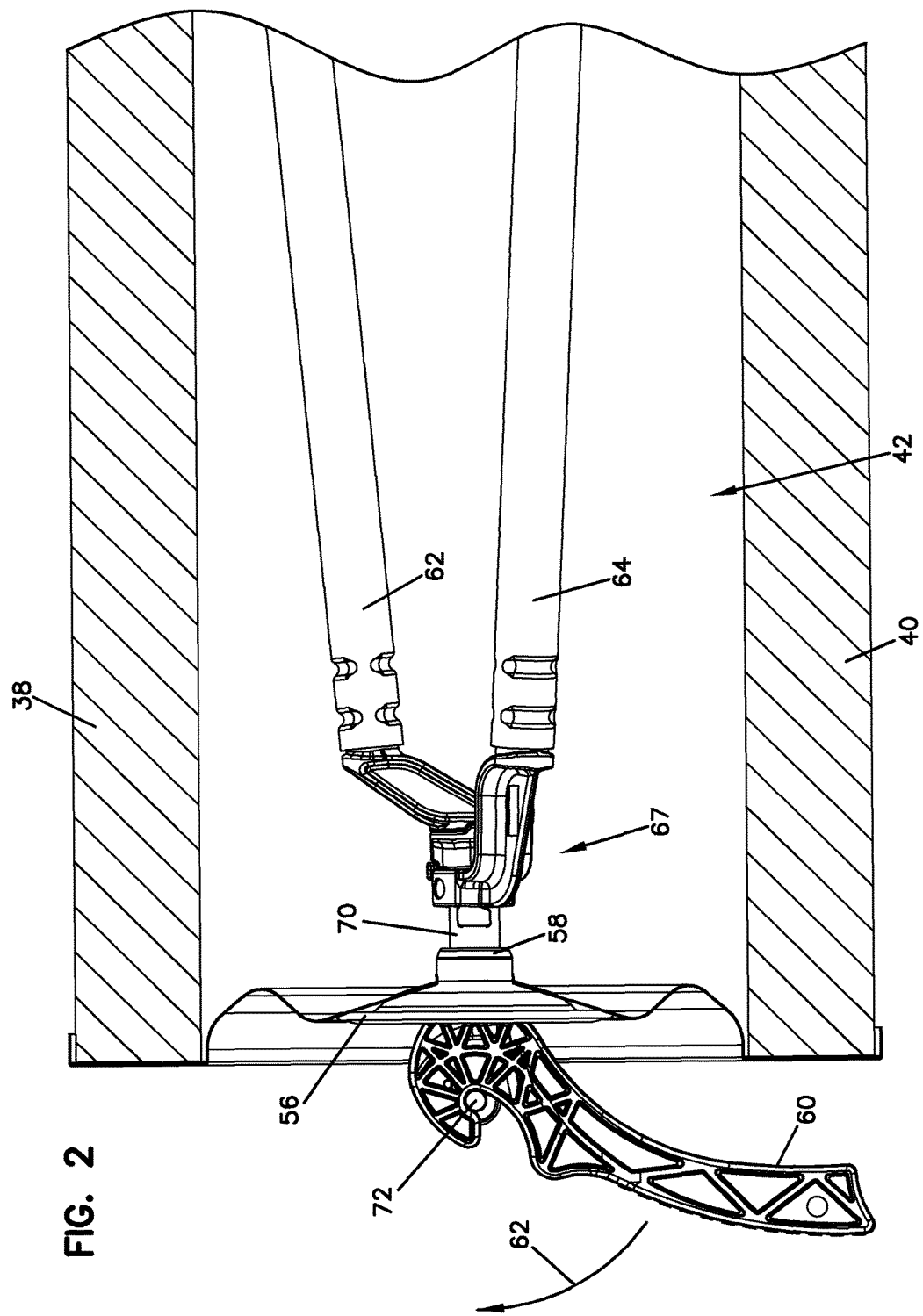
FIG. 2 is a schematic, side view of an end of one of the filter assemblies depicted in FIG. 1.

The first filter element 38 includes an end cap 54 at a free end opposite of the tube sheet 34. There is a cover 56 extending over the end cap 54 and an open end of the extension of filter media 40. In FIG. 2, it can be seen how the cover 56 includes an aperture 58. The aperture 58 accommodates a portion of the yoke arrangement 44.

In FIG. 2, it can also be seen how there is a release handle 60 connected to a portion of the yoke arrangement 44. The handle 60 is shown in FIG. 2 in a position bearing against the end cover 56, which is a position that locks or holds the filter assembly 32 to the tube sheet 34. The handle 60 is moveable or pivotable in a direction shown at arrow 62 to a second position, in which the handle 60 is generally axially aligned with a central axis of the first filter element 38. In this position, the handle 60 no longer bears against the end cover 56, and this releases the filter assembly 32 from being clamped in a mounted position against the tube sheet 34.

One example of handle 60 useable herein is described in Patent Publication WO 2011/005438, incorporated by reference herein.

Figure 3:
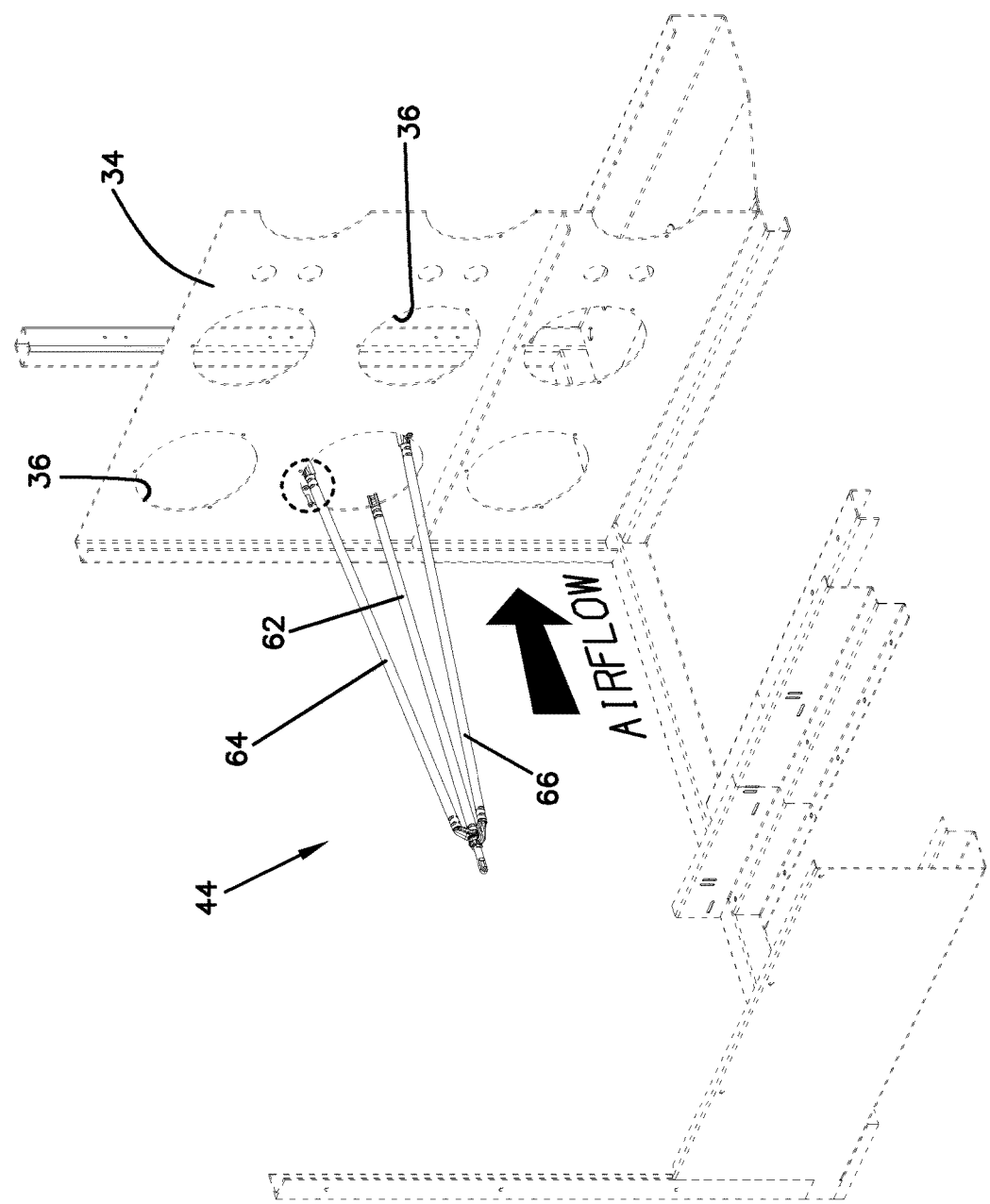
FIG. 3 is a schematic, perspective view illustrating only the yoke arrangement connected to a tube sheet, constructed in accordance with principles of this disclosure.
Figure 9:
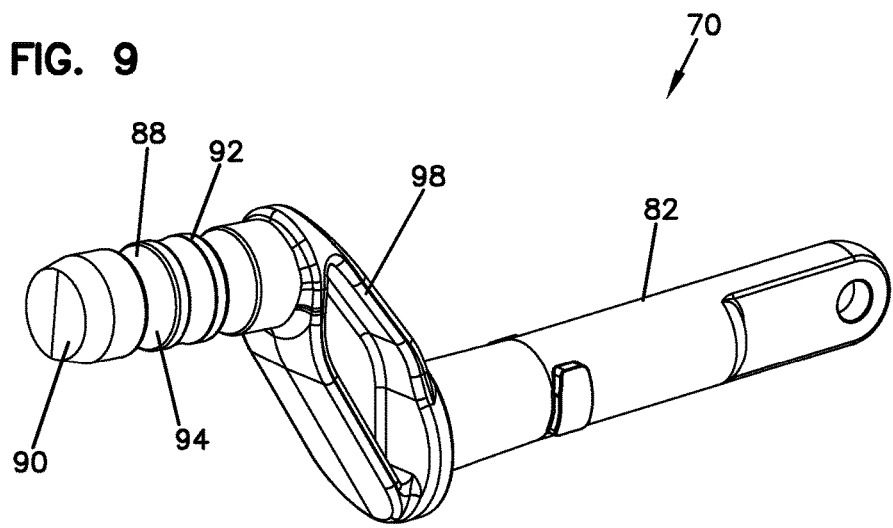
FIG. 9 is a perspective view of the clamp rod used in the first leg assembly of FIGS. 7 and 8.
Figure 10:
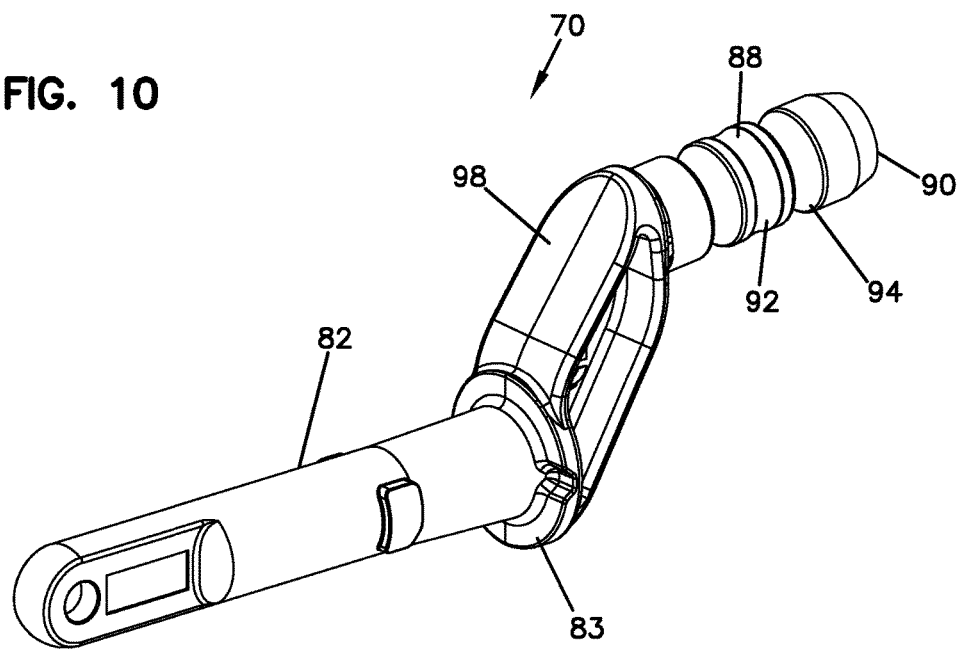
FIG. 10 is another perspective view of the clamp rod of FIG. 9.
Figure 11:
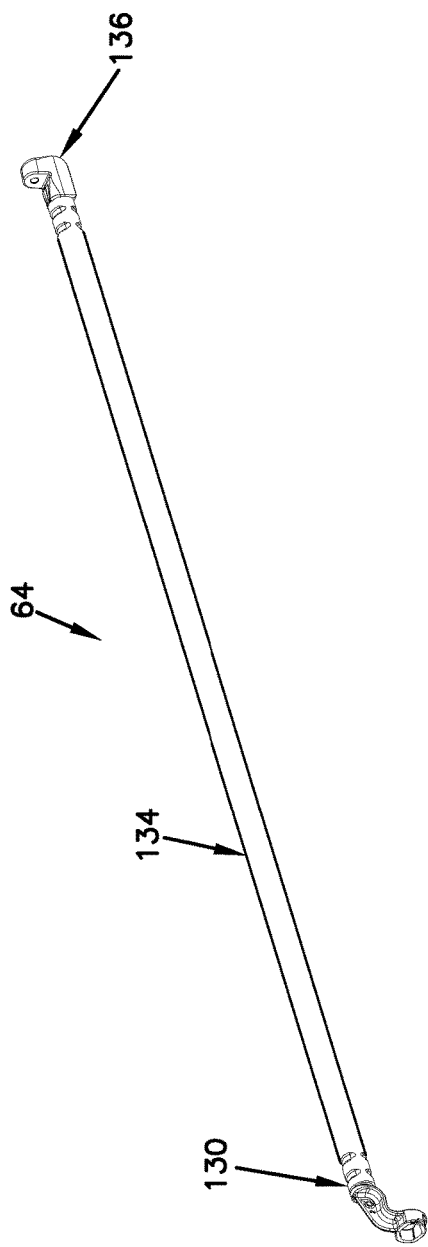
FIG. 11 is a perspective view of a second leg assembly used in the yoke arrangement of FIG. 3.

FIG. 3 illustrates the yoke arrangement 44 attached to the tube sheet 34. The yoke arrangement 44 includes a first leg assembly 62, second leg assembly, 64 and third leg assembly 66.

The first leg assembly 62, second leg assembly 64 and third leg assembly 66 may be arranged relative to each other in a tripod-type arrangement. That is, the assemblies, 62, 64, 66 may increase in circumferential spacing relative to each other from one end to the opposite end. In the embodiment shown, the leg assemblies 62, 64, 66 have the widest circumferential spacing at the tube sheet 34, and narrowest at a connection end 67.

In FIG. 4, it can be seen that the yoke arrangement 44 has an overall length 68 between a projection 72, (which is described further below), and the tube sheet 34. The length 68 can be at least 100 centimeters. In some embodiments, the distance 68 can be at least 110 centimeters. In some embodiments, the distance 68 can be 130-140 centimeters.

The first leg assembly 62 includes a clamp rod 70. The clamp rod 70 will typically extend through the aperture 58 (FIG. 2) in the end cover 56.

The clamp rod 70 can include projection 72 (FIGS. 2 and 5). The release handle 60 engages the projection 72, as it pivots from the first, locked position shown in FIG. 2 to a released position, in which the handle 60 is released from and is not bearing against the end cover 56 as described above.

The first leg assembly 62 further includes a first element support 74 (FIGS. 7 and 8). The first element support 74 is typically rod-shaped. It extends between the clamp rod 70 and a first foot 76, which is also part of the first leg assembly 62.

In some embodiments, the first leg assembly 62 can be an integral, one molded piece. In other embodiments, the first leg assembly 62 can be made from at least three parts (clamp rod 70, first element support 74, and foot 76) which are then attached together, either permanently or releasably.

In the embodiment shown the first leg assembly 62 is made from at least the three parts (clamp rod 70, first element support 74, and foot 76) which are then attached together, either permanently or releasably.

The first element support 74 can be tubular with opposite connecting ends 78, 80. The connecting ends 78, 80 are sized and constructed to receive and connect with the clamp rod 70 and first foot 76.

In reference to FIGS. 7-10, the clamp rod 70 has a portion 82 that is laterally spaced from the first element support 74. As can be seen in FIG. 8, the offset portion 82 has a longitudinally axis 84, and the first element 74 has longitudinally axis 86. The axis 84 of the clamp rod portion 82 is angled relative to the first element support 74 including its axis 86. The angle depicted is generally an acute angle.

The clamp rod 70 further includes a connecting end 88. The connecting end 88 is secured to the first element support 74. In the example shown in FIG. 8, the connecting end 88 is inserted into and received by a tubular opening of the connecting end 78 of the first element support 74.

The connecting end 88 defines a free end 90. From the free end 90 is an extension 92 defining ribs 94 therein. The ribs 94 engage projections 96 (FIG. 8) in the connecting end 78 of the first element support 74. These ribs 94 and projections 96 help to hold and lock the clamp rod 70 to the first element support 74.

Between the rod portion 82 and the extension 92 is a bridge section 98. The bridge section 98 is angled relative to the portion 82 by angle 100. Angle 100 is greater than 90 degrees, and less than 180 degrees.

In this example embodiment, the extension 92 is received within the connection end 78 at a length shown at 102. The length 102 can be many sizes including at least 25 millimeters, or in other embodiments at least 35 millimeters. In some embodiments, the length 102 can be 45-55 millimeters.

At an end opposite of the clamp rod 70, the first leg assembly 62 includes the first foot 76. The first foot 76 includes a foot connecting end 104 having a free end 106 (FIG. 6) and an extension 108. Along the extension 108 are ribs 110.

In FIG. 8, the first element support 74 is sized to receive the extension 108 of the foot connecting end 104 through the connection end 80. Projections 112 in the first element support 74 engage the ribs 110 and help to lock the first foot 76 to the first element support 74.

The first foot 76 includes a toe 114. The toe 114 is generally perpendicular to a remaining portion of the first foot 76. In FIG. 6, it can be seen how the toe 114 defines a fastener-receiving aperture 116. In use, the foot 76 will engage the tube sheet 34 such that the toe 114 is on an opposite side of the tube sheet 34 than the rest of the foot 76. In general, the toe 114 will be on the clean, filtered side of the tube sheet 34, while the rest of the first foot 76 will be on the dirty, unfiltered side of the tube sheet 34. The aperture 116 can be used to receive a fastener to help secure the foot 76 to the tube sheet 34.

The extension 108 of the foot 76 can be received within the connection end 80 of the first element support 74, at distance shown at 118. This distance 118 can be at least 25 millimeters. In some embodiments, this distance 118 can be at least 35 millimeters. In some embodiments, the distance 118 can be between 45-55 millimeters.

Still in reference to FIG. 8, the first leg assembly 62 can have a distance 120 from a free end 122 of the clamp rod 70 to a free end 124 of the foot 76 of at least 100 centimeters. In some embodiments, the distance 120 can be at least 120 centimeters. In some embodiments, the distance 120 can be 130-150 centimeters.

Figure 12:
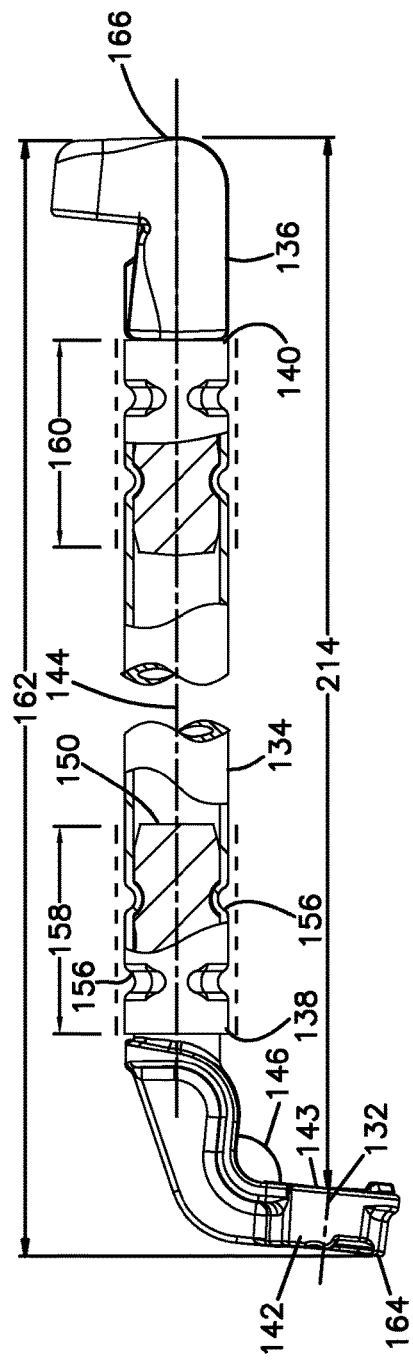
FIG. 12 is an enlarged, side view, partially in cross section, of the second leg assembly of FIG. 11.
Figure 13:
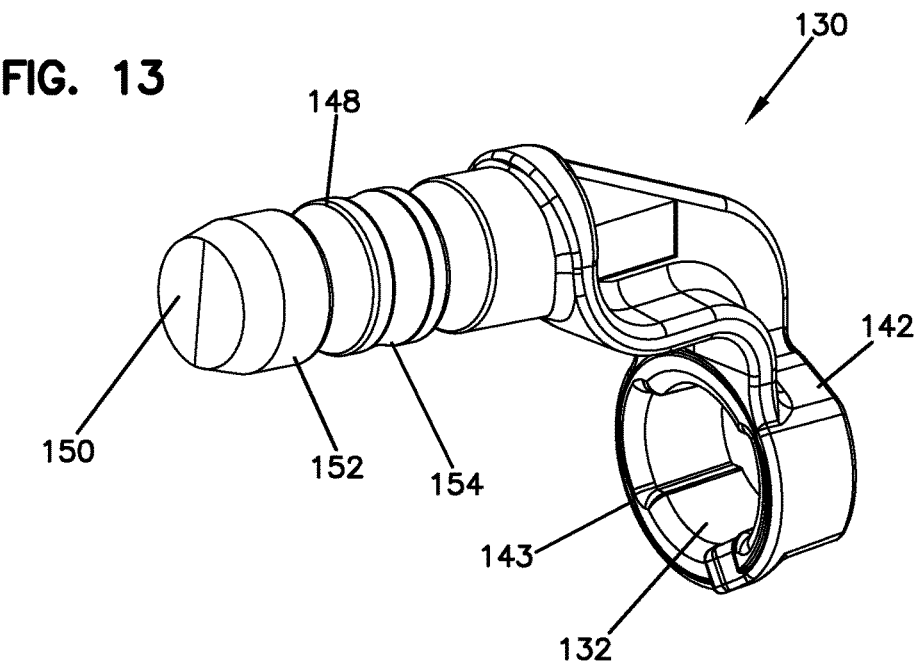
FIG. 13 is a perspective view of a second leg holding rod used in the second leg assembly of FIGS. 11 and 12.
Figure 14:
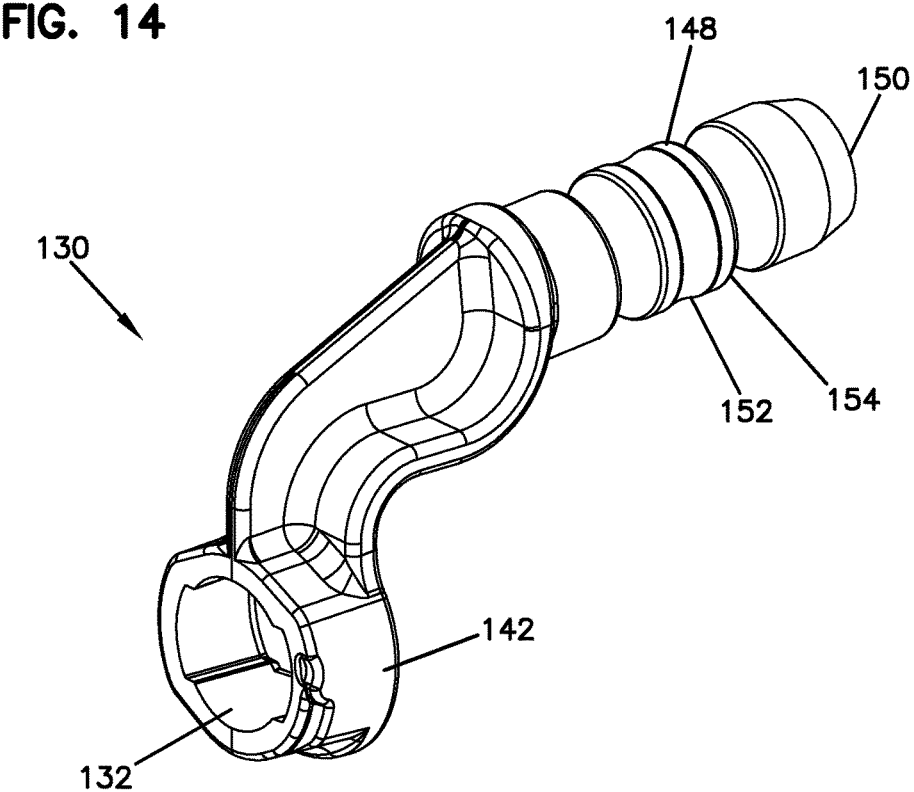
FIG. 14 is another perspective view of the second leg holding rod of FIG. 13.

In reference now to FIGS. 11-14, the second leg assembly 64 is further illustrated. The second leg assembly 64 includes a second leg holding rod 130. The second leg holding rod 130 is configured to hold the clamp rod 70 of the first leg assembly 62. Many embodiments are possible. In the one shown, the second leg holding rod 130 includes a second rod aperture 132 (FIGS. 13 and 14). The second rod aperture 132 is sized to be positioned over and securely hold the clamp rod 70.

The second leg assembly 64 further includes a second element support 134 and a second foot 136. The second foot 136 is constructed and arranged for releasable attachment to the tube sheet 34. In this embodiment, the second foot 136 is constructed the same as the first foot 76, as described above and shown in FIG. 6. The second element support 134 extends between the second leg holding rod 130 and the second foot 136. The second element support 134 is constructed analogously as the first element support 74, described above. As such, the second element support 134 is tubular and includes opposite connecting ends 138, 140. In other embodiments, the second leg assembly 64 could include a single, molded construction.

The second leg holding rod 130 has a portion 142 laterally spaced from the second element support 134. As can be seen in FIG. 12, the laterally spaced portion 142 is the portion of the second leg holding rod 130 that defines the second rod aperture 132. From reviewing FIG. 12, it can be seen how the portion 142 is angled relative to a longitudinal axis 144 of the second element support 134. The angle, shown at reference numeral 146, can be many different angles, and in the one shown is greater than 90 degrees, and less than 120 degrees.

The second leg holding rod 130 has a connecting end 148 defining a free end 150. The connecting end 148 includes an extension 152 with ribs 154. The extension 152 is received within the tubular portion of the second element support 134 at the connecting end 138. Projections 156 in the second element support 134 engage the ribs 154 to help lock the second leg holding rod 130 to the second element support 134. Many embodiments are possible.

The length of the extension 152 within the second element support 134 is shown at 158 and can be at least 25 millimeters, in some embodiments at least 35 millimeters, and in some embodiments, 45-55 millimeters.

Similarly, the second foot 136 is received within the connecting end 140. The connection between the second foot 136 and the second element support 134 is analogous to the connection described above between the first element support 74 and the first foot 76. The length of the connection is shown at 160, and can be at least 25 millimeters, in some embodiments, at least 35 millimeters, and in some embodiments, 45-55 millimeters.

An over length, 162 of the second leg assembly 64 between a free end 164 and an end of the foot 136 at 166 can be at least 100 centimeters, in some embodiments at least 110 centimeters, and in some embodiments, at least 125-135 centimeters.

In reference now to FIGS. 15-18, the third leg assembly 66 is illustrated. The third leg assembly 66 includes a third leg holding rod 170. The third leg holding rod 170 is configured to hold the clamp rod 70. Many different embodiments are possible.

In the embodiment illustrated, the third leg holding rod 170 includes a third rod aperture 172. The third rod aperture 172 is sized to receive and hold the clamp rod 70 in place. When operably assembled, the second leg holding rod 130 and third leg holding rod 170 are oriented against each other, with the clamp rod 70 extending through the second rod aperture 132 and third rod aperture 172 such that the second leg holding rod 130 and third leg holding rod 170 are holding the clamp rod 70.

The third leg assembly 66 includes a third element support 174 and a third foot 176. The third element support 174 extends between the third leg holding rod 170 and the third foot 176. The third foot 76 is constructed the same as the first foot 76, as described above and illustrated in FIG. 6.

The third leg assembly 66 can be molded from a single part, or it can include at least the third leg holding rod 170, third element support 174, and third foot 176 connected (permanently or releasably) together.

In the illustrated embodiment, the third element support 174 includes opposite connecting ends 180, 182 constructed and sized to receive the third leg holding rod 170 and the third foot 176, respectively.

The third leg holding rod 170 has a portion 184 laterally spaced from the third element support 174. The third leg holding rod portion 184 is the portion that defines the third rod aperture 172.

As can be seen in FIG. 16, the third element support 174 has a longitudinally axis 186. The third leg holding rod portion 184 is angled relative to the axis 186 at an angle 188. Many different embodiments are possible. In the illustrated embodiment, the angle 188 is greater than 90 degrees and less than 120 degrees.

The third leg holding rod 170 includes a connecting end 190. The connecting end 190 includes a free end 192 and an extension 194. The extension 194 defines ribs 196 that engage projections 198 in the third element support 174. This engagement helps to hold or lock the third leg holding rod 170 into the third element support 174.

The extension 194 of the connecting end 190 is received within the connecting end 180 of the third element support 174 by a length 202. The length 202 can be many different lengths including at least 25 millimeters, in some embodiments at least 35 millimeters, and in some embodiments, 45-55 millimeters.

The third foot 176 is the same as the first foot 76. It is received within the connecting end 182 of the third element support 174, analogously as described above with respect to the first foot 76 and the first element support 74. The length 204 of the extension of the foot 176 is at least 25 millimeters, in some embodiments at least 35 millimeters, and in some embodiments 45-55 millimeters.

In overall length 206 of the third leg assembly 66 from an end 208 of the third leg holding rod 70 to a free end 210 of the foot 176 is at least 100 centimeters, in some embodiments at least 110 centimeters, and in some embodiments 125-135 centimeters.

Reference is made to FIGS. 8, 12, and 16. The first leg assembly 62, second leg assembly 64, and third leg assembly 66 are sized relative to each other such that they can be fitted together to form the assembled yoke arrangement 44 (FIG. 1). In one or more example embodiments, a length 212 (FIG. 8) between the free end 124 of the foot 76 and a base 83 of the portion 82 of the clamp rod 70 is sized about the same as a length 214 (FIG. 12) between free end 166 of the foot 136 and a base 143 of the portion 142 of the second leg holding rod 130.

The approximate equal length of 212 and 214 allows the base 143 of the second leg holding rod 130 to engage against the base 83, when the second leg assembly 64 is connected to the first leg assembly 62 by having the second rod aperture 132 receive the clamp rod 70.

In one or more example embodiments, a length 216 (FIG. 16) between free end 210 of the foot 176 and a base 185 of portion 184 of the third leg holding rod 170 is about the same length as length 162 (FIG. 12) of the second leg assembly 64. This allows the base 185 to engage against free end 164 of the second leg assembly 64 when both the second leg assembly 64 and the third leg assembly 66 are operably mounted on the clamp rod 70 of the first leg assembly 62.

In reference again to FIG. 1, it can be seen how the yoke arrangement 44 is used to hold the filter assembly 32. Each foot 76, 136, 176 is attached to the tube sheet 34. The first element support 74, second element support 134 and third element support 174 extends within the filter interiors 42, 50 to the connection assembly 67. The connection assembly 67 includes the clamp rod 70, the second leg holding rod 130, and the third leg holding rod 170. The clamp rod 70 extends from the open filter interior 42, through the aperture 58 in the cover 56. There, it engages with the release handle 60.

In FIG. 1, the filter assembly 32 is shown operably mounted and locked into position to the tube sheet 34. A seal member (not shown) between the tube sheet 34 and the tube sheet end of the second filter element 46 forms a seal between the filter assembly 32 and the tube sheet 34. A seal is also formed by a seal member (not shown) between the engaging ends of the first filter element 38 and second filter element 46.

A method of assembling the yoke arrangement 44 includes providing first leg assembly 62, with clamp rod 70, first element support 74, and first foot 76 constructed and arranged for releasable attachment to the tube sheet 34.

The method further includes providing second leg assembly 64 having second leg holding rod 130, second element support 134, and second foot 136 constructed and arranged for releasable attachment to the tube sheet 34.

The method further includes securing the second leg holding rod 130 to the clamp rod 170. In some embodiments, this can be done by orienting the clamp rod 70 through second rod aperture 132 in the second leg holding rod 130.

The method can further include providing third leg assembly 166 having third leg holding rod 170, third element support 174, and third foot 176 constructed and arranged for releasable attachment to the tube sheet 34.

The method can include securing the third leg holding rod 170 to the clamp rod 70. In one embodiment, this can be done by orienting the clamp rod 70 through the third rod aperture 172 in the third leg holding rod 170.

In one embodiment, when the clamp rod 70 is oriented through the second rod aperture 132 and third rod aperture 172, the second leg holding rod 130 and third leg holding rod 170 are oriented against each other holding the clamp rod 70.

After the yoke arrangement 44 is assembled, and mounted to the tube sheet, the filter assembly 32 can be mounted thereover. The second filter element 46 will first be mounted over the yoke arrangement 44, followed by the first filter element 38. The clamp rod 70 is then extended through the cover 56, and the release handle 60 is engaged with the projection 72 on the clamp rod 70. The release handle 60 is pivoted to the position shown in FIGS. 1 and 2 so that it is bearing against the cover 56, which provides a pulling force on the rest of the yoke arrangement 44 and helps to form the seals to securely mount the filter assembly 32 onto the tube sheet 34.

B. The Embodiment of FIGS. 19-24

Figure 19:
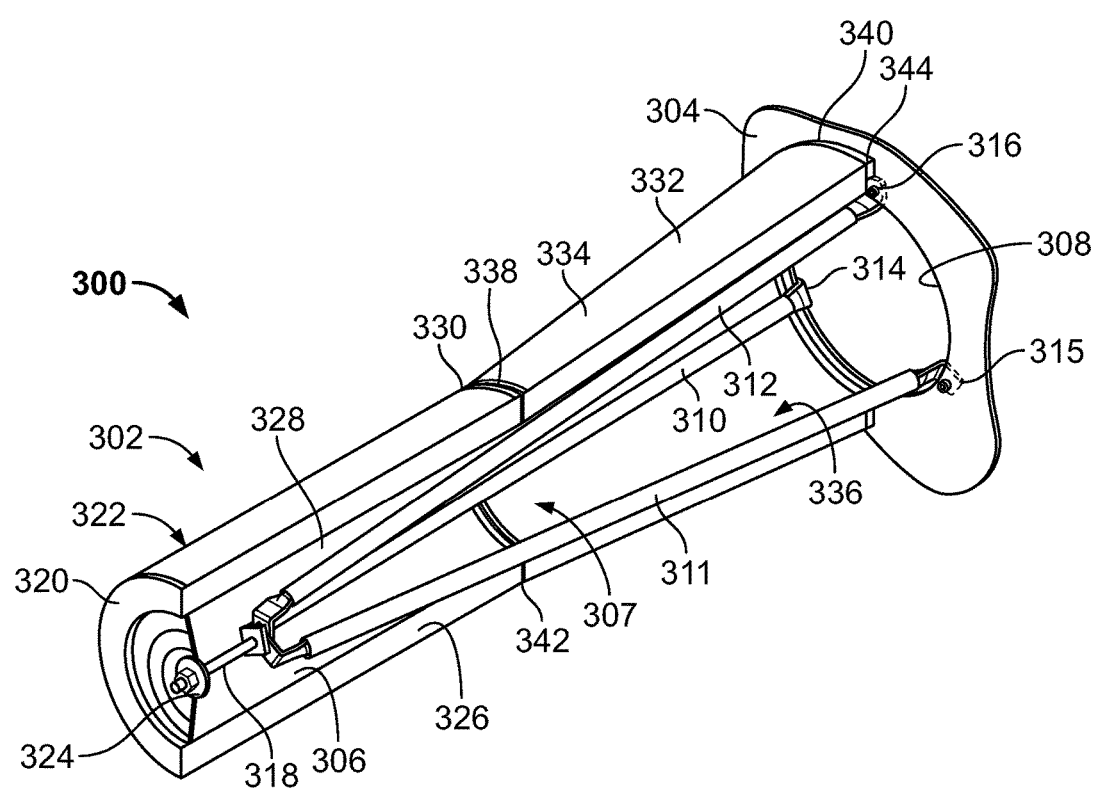
FIG. 19 is a schematic, perspective, sectional view of another yoke arrangement and filter assembly, constructed in accordance with principles of this disclosure.

FIG. 19 illustrates another embodiment of a system 300 useable as an intake for a gas turbine, dust collector, compressor, or other types of systems. The system 300 includes a filter assembly 302 releasably mounted to a tube sheet 304 using a yoke arrangement 306. As described above, the tube sheet 304 will typically include a plurality of apertures 308, each aperture 308 having filter assembly 302 mounted thereover. For purposes of simplicity, only a single filter assembly 302 and aperture 308 is illustrated in this embodiment.

The yoke arrangement 306 can be any type of yoke arrangement. In the one shown in FIG. 19, the yoke arrangement 306 includes a tripod-type arrangement 307 with three legs 310, 311, 312. At the tube sheet end of each leg 310-312 is a foot 314, 315, 316 for releasably mounting the yoke arrangement 306 to the tube sheet 304. A rod 318 extends from the top of the tripod arrangement 307 and through an end cap 320 of a first filter element 322. A nut and washer assembly 324 engages the rod 318 and puts an axial force on the yoke arrangement 306 to help press the filter assembly 302 against the tube sheet 304 and form the appropriate seals.

Figure 24:
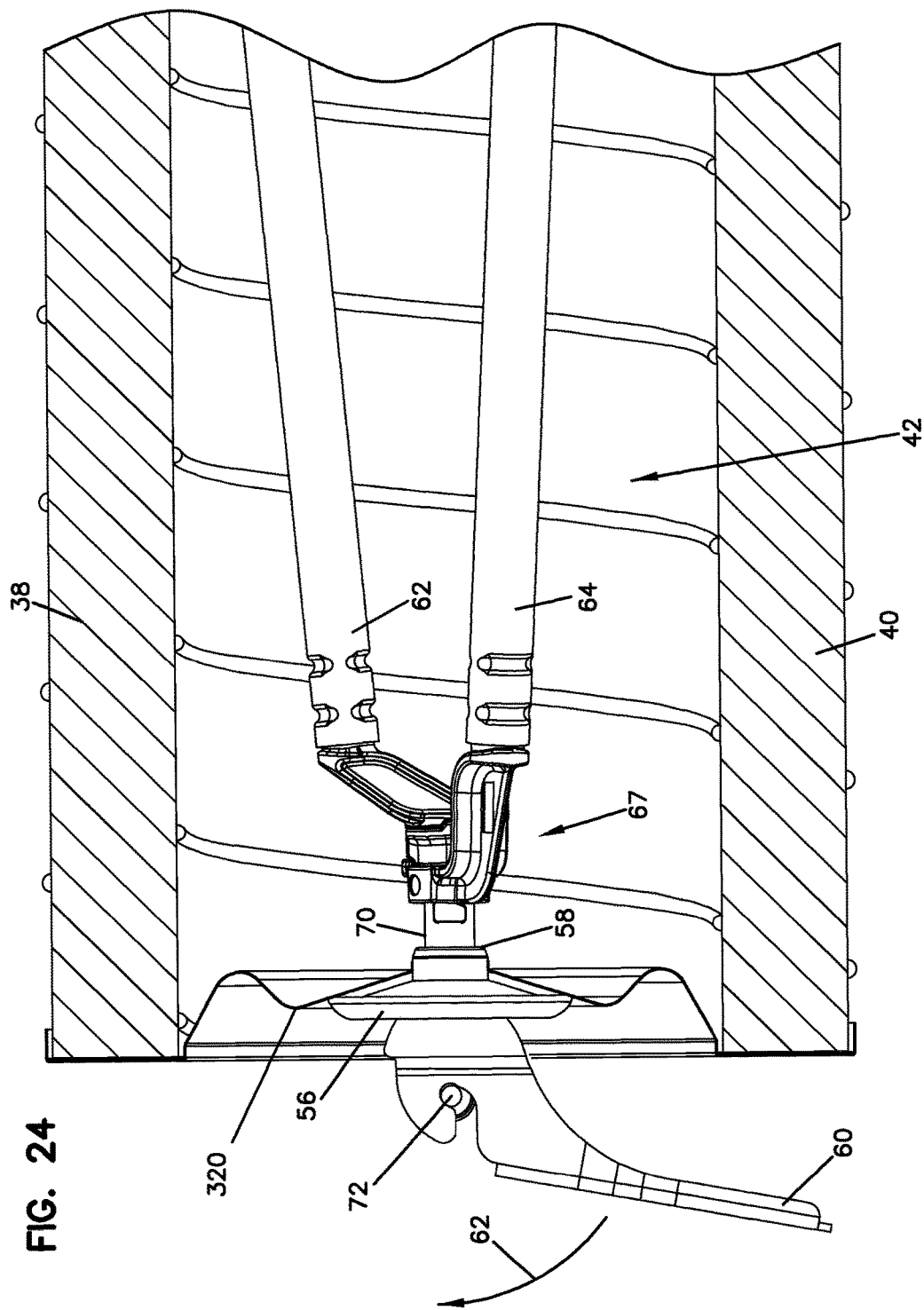
FIG. 24 is a schematic side view of an the yoke assembly of FIGS. 1 and 2 used with the filter assembly of FIG. 19 having the end cap of FIGS. 20-23.

While the embodiment of FIG. 19 shows the yoke arrangement 306 used with the filter assembly 302, it should be understood that the filter assembly 302 can be used with any kind of yoke arrangement, including the yoke arrangement 44, as characterized above. This is shown in the embodiment of FIG. 24. With respect to the features of the filter assembly 302, it does not matter whether the yoke arrangement 306 or the yoke arrangement 44 is used.

The filter assembly 302 includes at least the first filter element 322. The first filter element 322 includes a tubular extension of filter media 326 forming an open filter interior 328. The filter media 326 can be many different types of media, including pleated media, and in many examples, cellulose media, with or without fine fibers.

In the embodiment shown, the tubular extension in a filter media 326 forms a cylinder shape, such that the cross section of the open interior 328 is circular, having a uniform diameter throughout.

The first filter element 322 includes the first end cap 320 secured to the filter media 326. The end cap 320 can be secured at or near an end of the filter media 326 to close the filter interior 328.

At an end opposite of the first end cap 320, the first element 322 can include a second end cap 330. The second end cap 330 can be secured at or near an end of the filter media 326. As illustrated in FIG. 19, the second end cap 330 is generally an open end cap to provide access to the open interior 328.

In some embodiments, the filter assembly 302 further includes a second filter element 332. The second filter element 332 can be axially aligned with the first filter element 322. In this embodiment, the second filter element 332 is between the second end cap 330 of the first element 322 and the tube sheet 304.

The second element 332 includes an extension of filter media 334. The filter media 334 is tubular and defines an open filter interior 336. The media 334 can be many different types of media. For example, the media 334 can be pleated media, such as pleated cellulose with our without fine fibers.

The filter media 334 of the second element 332 is tubular in shape, but generally conical, extending from a narrow end adjacent to the first filter element 322 to a wide end adjacent to the tube sheet 304.

The second element 332 can include opposite first and second end caps 338, 340. In this embodiment, both the first end cap 338 and second end cap 340 are open end caps.

When the filter assembly 302 is operably assembled and mounted to the tube sheet 304, usually a seal 342 is created between the engaging second end cap 330 of the first element 322 and first end cap 338 of the second element 332. In addition, a seal 334 is created between the second element 332 and the tube sheet 304. This is usually between the second end cap 340 and the tube sheet 304.

In normal operation, the force applied to the nut and washer assembly 324 translates into a force through the yoke arrangement 306 and ultimately forming the seals 342, 344. The seals 342, 344 can be formed by gaskets. Compression on the gaskets can be influenced by the weather, and the condition of the gaskets. Over time, the force applied through the yoke arrangement 306 can decrease. In addition, in cold weather, more force is needed on the yoke arrangement 306 in order to get effective seals formed.

The first end cap 320 is constructed and arranged to act as a spring when an external force is applied. For example, the external force can be applied from the nut and washer assembly 324, through engagement of the rod 318. This external force can be applied as part of yoke arrangement 306. By acting as a spring, the end cap 320 addresses the problems that result due to fluctuations in temperature and time passage. The end cap 320, acting as a spring, will result in a high quality sealing of the filter assembly 302 during initial installation. There will be fewer problems due to gaskets relaxing and the subsequent effect of losing gasket compression force. Further, there is increased probability of obtaining a leak-proof (or substantially leak-proof) installation of the filter assembly 302. Impact from differences in contraction and expansion due to differences in materials can be absorbed by the spring end cap 320.

Figure 20:
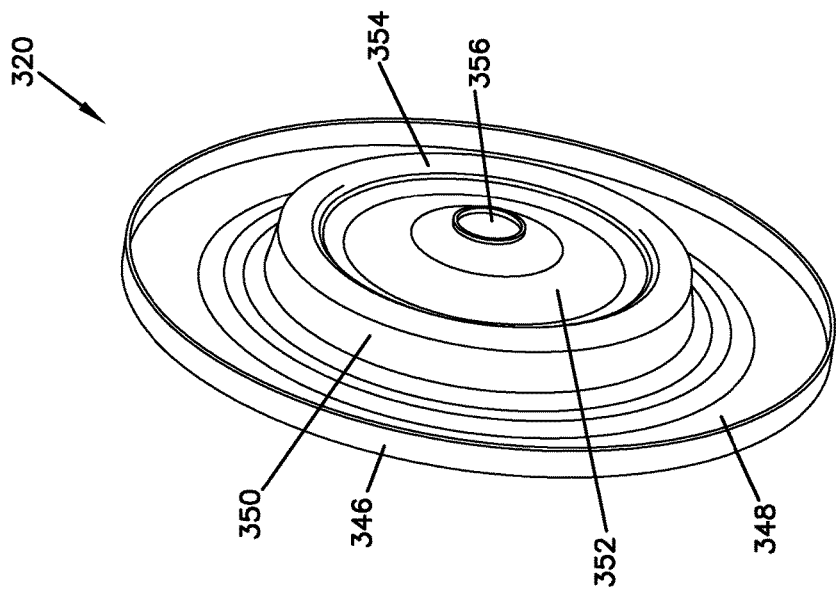
FIG. 20 is a schematic, perspective view of an end cap used in the filter assembly of FIG. 19.
Figure 21:
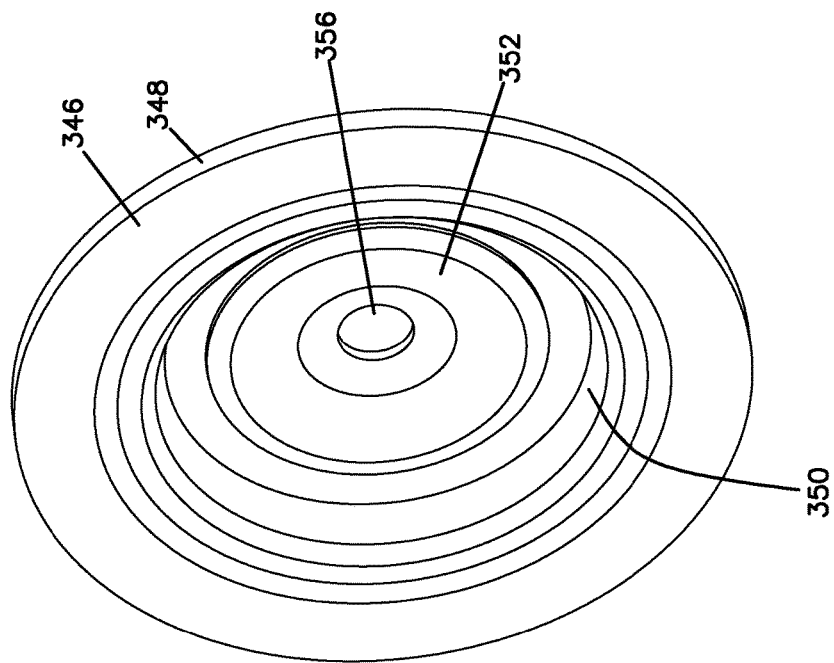
FIG. 21 is another schematic, perspective view of the end cap of FIG. 20.

In reference now to FIGS. 20 and 21, the first end cap 320 is illustrated in perspective view. The view in FIG. 20 is from an outside view of the end cap 320. The view of FIG. 21 is the end cap 320 as it would be viewed from the open interior 328 of the first element 322.

The end cap 320 is constructed and arranged to act as a spring, due to its geometric shape. Many embodiments are possible. In the embodiment shown, the first end cap 320 includes an outer rim 346. The outer rim 346 is near or at the outer periphery of the filter media 326.

Extending radially inwardly from the outer rim 346 is a first section 348. The first section 348 can be generally flat as it extends radially inwardly from the rim 346.

Figure 22:
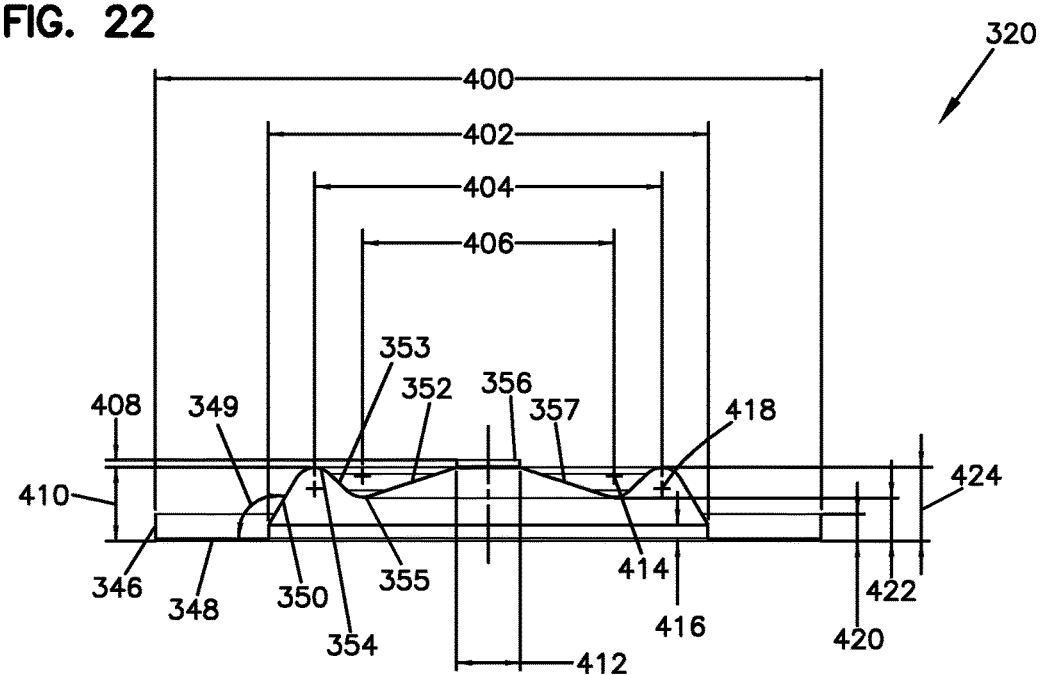
FIG. 22 is a schematic, cross-sectional view of the end cap of FIG. 20, the cross-section being taken along the line A-A of FIG. 23.
Figure 23:
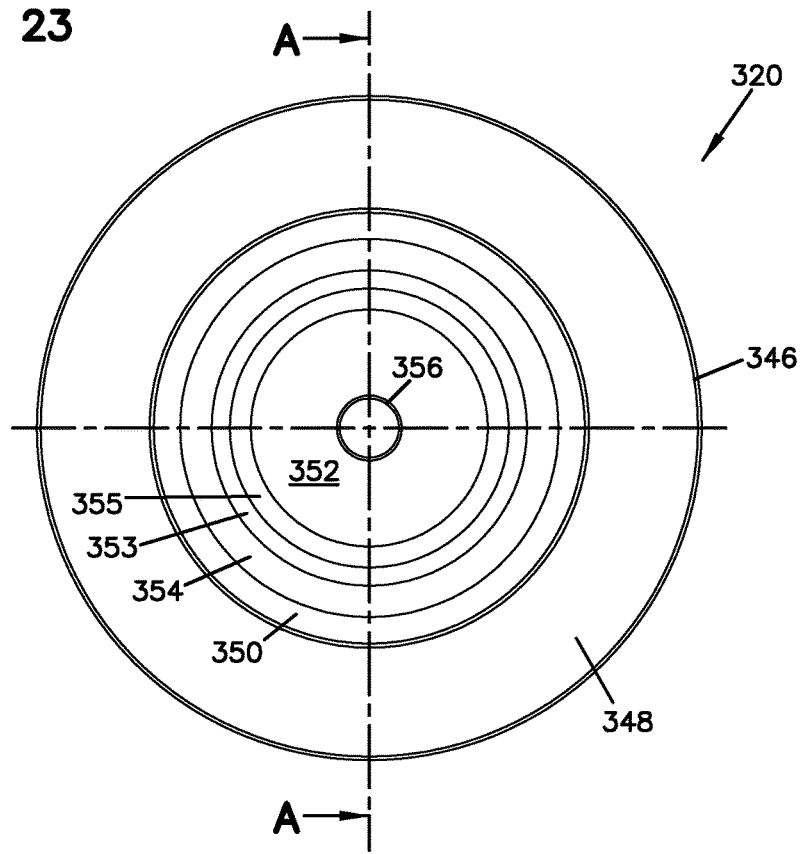
FIG. 23 is a schematic top view of the end cap of FIG. 20.

Radially inward of the first section 348 and adjacent to the first section 348 is an extending wall 350. The extending wall 350 extends into the open filter interior 328. The first section 348 is between the extending wall 350 and the rim 346. The extending wall 350, as can be seen in FIG. 22, can extend at an angle 349 relative to the first section 348. In one or more example embodiments, the angle 349 can be at least or about 90 degrees; and in some embodiments, 95-130 degrees; and in some embodiments, at least 90 degrees and less than 140 degrees.

A center section 352 is recessed relative to the extending wall 350, as viewed from the filter interior 328, when the end cap 320 is in an unstressed state or condition. The center section 352 is attached to the extending wall 350 at a rounded joint 354. The center section 352 defines a center aperture 356. The aperture 356 receives the rod 318 of the yoke arrangement 306.

Extending from the rounded joint 354, the center section 352 slopes along a first surface 353 in a direction away from wall 350 and toward the first section 348 until reaching a radiussed valley 353.

From valley 353, the center section 352 slopes along a second surface 357 in a direction away from first surface 353 and away from the first section 348 until reaching the center aperture 356.

The first end cap 320 can be made from a material to allow it to be shaped, as described above, and to have the spring-type properties. In this embodiment, the end cap 320 is made from steel. The steel may be heat treated, in some embodiments.

The spring-type properties of the first end cap 320 allows it to elastically deform and transmit force onto seal members to create seals 342, 344.

FIGS. 20 and 21 show the end cap 320 when it is in an unstressed condition. In one or more non-limiting examples, when force is applied to the end cap 320, there is a displacement of the end cap 320 as measured between the most extreme sections of the end cap 320 of greater than 0.14 millimeter.

When the filter assembly 302 uses the end cap 320, force is applied through the yoke arrangement 306 (in one non-limiting embodiment) by tightening the nut and washer assembly 324. This causes an axial force on the first end cap 320 by the nut and washer assembly 324. The cap 320 will act as a spring and deform with displacement to create the seals 342, 344. As the weather changes, or as gaskets relax, the end cap 320 will adjust by the change in shape of the end cap 320.

When the filter assembly 302 uses the end cap 320 with the yoke arrangement 44 (FIG. 24), the release handle 60 is pivoted to the position shown in FIGS. 1 and 2 so that it is bearing against the cover 56, which provides a axial force on the first end cap 320. The cap 320 will act as a spring and deform with displacement to create the seals between the filter assembly 32 and the tube sheet 34, as well as between the engaging ends of the first filter element 38 and second filter element 46. As the weather changes, or as gaskets relax, the end cap 320 will adjust by the change in shape of the end cap 320.

Non-limiting example dimensions that are useable in one or more example embodiments of the end cap 320 are described below with respect to FIG. 22. It should be understood these are examples only, and many variations can be made relative to overall size and relative to each other within the end cap 320:

| Reference number | Example dimension (mm) |
| --- | --- |
| 400 | diameter 322 |
| 402 | diameter 213-215 |
| 404 | diameter 169 |
| 406 | diameter 124 |
| 408 | 3 |
| 410 | 36 |
| 412 | diameter 30 |
| 414 | radius 10 |
| 416 | 6-7 |
| 418 | radius 10 |
| 420 | 12-13 |
| 422 | 21 |
| 424 | 35-36 |

C. The Embodiment of FIGS. 25-36

Figure 25:
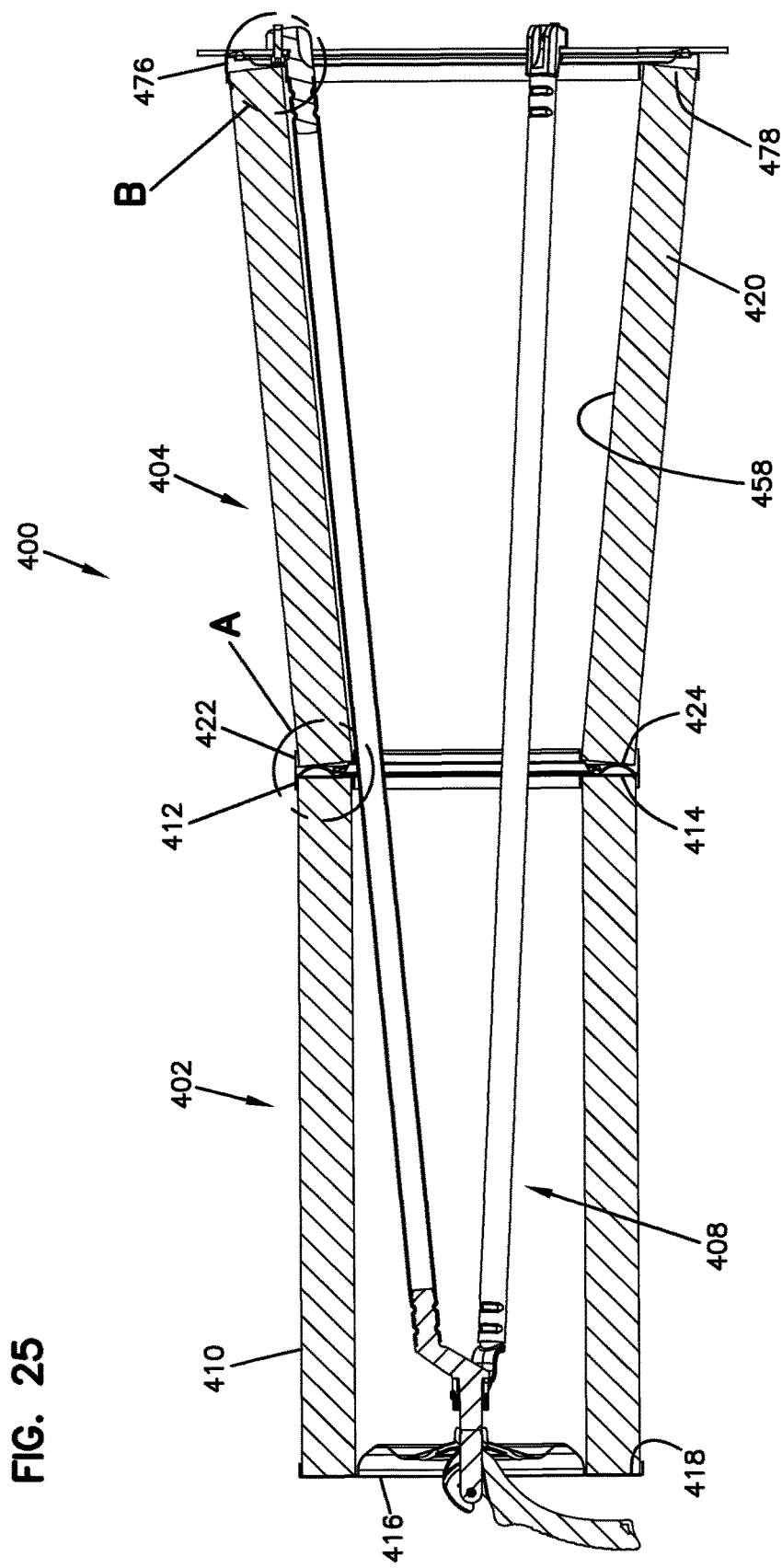
FIG. 25 is a schematic, cross-sectional view of a pair of filter assemblies mounted to a tube sheet, in which the filter assemblies utilize end caps constructed in accordance with principles of this disclosure.

Attention is directed to FIGS. 25-36, which illustrate another filter assembly utilizing end caps with features that lead to advantages. FIG. 25 shows a filter assembly at 400.

Figure 27:
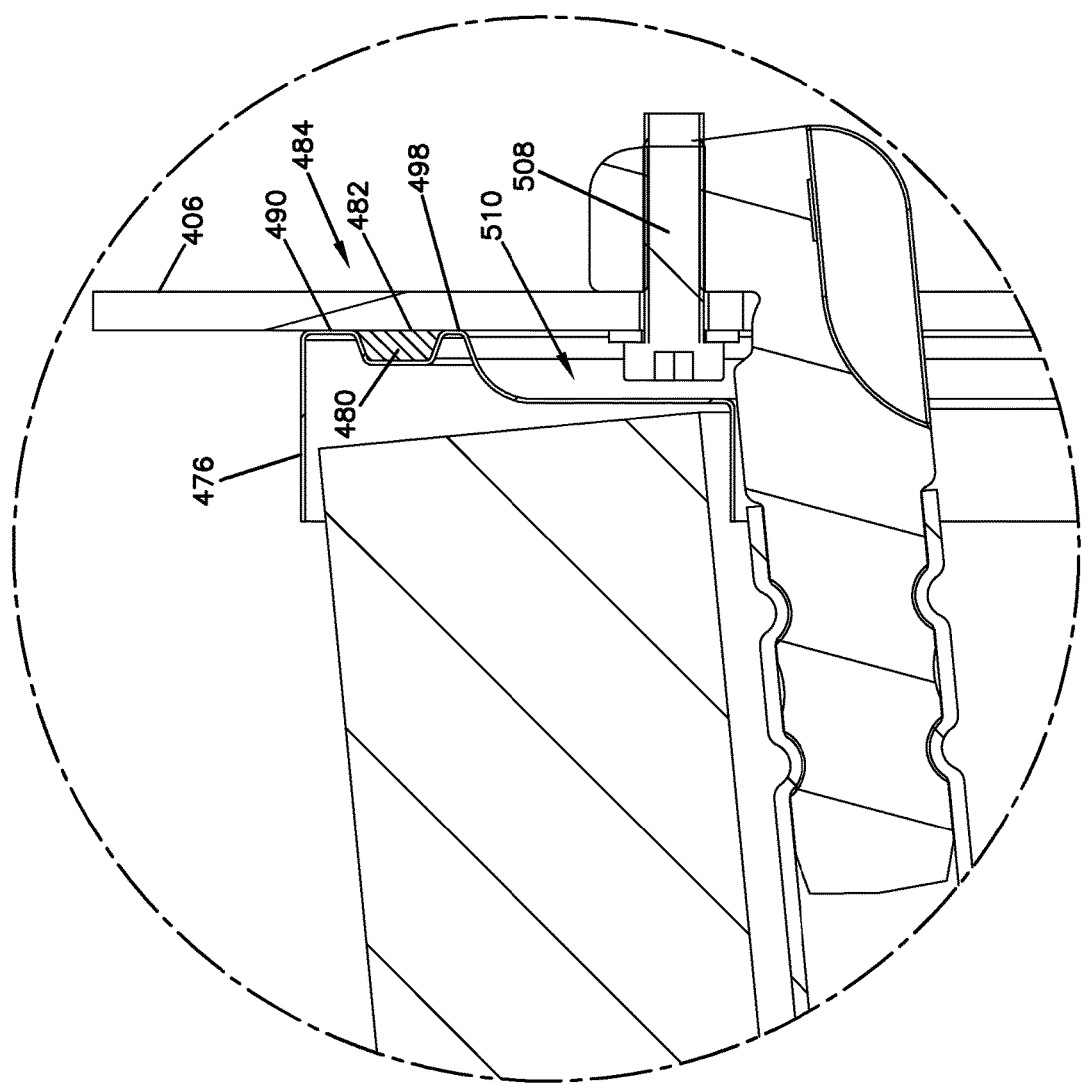
FIG. 27 is an enlarged cross-sectional view of section B of FIG. 25.

The filter assembly 400 includes a first filter element 402 and a second filter element 404. The first and second filter elements 402, 404 are typically arranged to be coaxially aligned and stacked against each other end-to-end. The second filter element 404 will typically be mounted against the tube sheet 406 (FIG. 27).

Holding the first filter element 402 and second filter element 404 together and mounted to the tube sheet 406 is a yoke assembly 408. The yoke assembly 408 can be any of the yoke assemblies as characterized above, including yoke arrangement 44 or yoke arrangement 306. Description of these yoke arrangements, as characterized above, is incorporated herein by reference.

Many different embodiments are possible. In the embodiment shown in FIG. 25, the first filter element 402 is cylindrical in shape, while the second filter element 404 is conical, with the smaller end of the cone having the same diameter as the diameter of the first filter element 402. The larger end of the cone for second filter element 404 is the end that is arranged against the tube sheet 406. In other embodiments, both the first filter element 402 and second filter element 404 may be cylindrical.

The first filter element 402 has a first tubular section of filter media 410. The filter media 410 can be many different types of media. In preferred embodiments, the filter media 410 is pleated media.

The first filter element 402 has at least a first open end cap 412 at one end 414 of the first tubular section of filter media 410.

In the embodiment shown in FIG. 25, the first filter element 402 includes a spring end cap 416 at an end 418 opposite of the end 414 of the first open end cap 412. The spring end cap 416 can be designed per the spring end cap 320, as described above. This description is incorporated herein by reference. In other embodiments, the end cap at end 418 need not be spring end cap, but can be any conventional end cap, such as end cap 54, described above, and the description of such being incorporated herein by reference.

The second filter element 404 has a second tubular section of filter media 420. The filter media 420 can be many different types of media, and in preferred implementations, is pleated media. The second filter element 404 includes a second open end cap 422 at one end 424 of the second tubular section of filter media 420.

In FIG. 25, it can be seen how the first and second filter elements 402, 404 are coaxially aligned with the first open end cap 412 opposing the second open end cap 422. The end 414 is adjacent to the end 424.

One of the first open end cap 412 and second open end cap 422 has a projecting gasket, and the other has a gasket-receiving surface, such that when the first end cap 412 is adjacent to the second end cap 422, as shown in FIG. 25, the projecting gasket is received by the gasket-receiving surface and forms a seal 429 between the first filter element 402 and second filter element 404.

The projecting gasket is shown at reference numeral 426. It can be mounted on either one of the first end cap 412 or second end cap 422. In this embodiment, the projecting gasket 426 is mounted on the first open end cap 412. The gasket-receiving surface 428 is on the second open end cap 422.

In some prior art arrangements, the gasket between the first filter element 402 and second filter element 404 can be over compressed, which leads to disadvantages. The arrangement disclosed herein addresses the problem of gasket over compression by providing an end stop arrangement 430 for the first and second end caps 412, 422. The end stop arrangement 430 engages to prevent over-compression of the projecting gasket 426, responsive to a force compressing the first filter element 402 and second filter element 404 against each other. For example, the yoke assembly 408 when engaged or tightened, will provide a compressive force squeezing the first filter element 402 and second filter element 404 together. The end stop arrangement 430 will prevent over-compression of the projecting gasket 426. Once the end stop arrangement 430 is engaged, there can be no further compression of the projecting gasket 426.

While many embodiments are possible, the end stop arrangement 430 comprises a projection-receiver assembly 432. One of the first and second open end caps 412, 422 has a projection 444 and the other of the first and second open end caps 412, 422 has a receiver 446 oriented to receive the projection 444 and provide a stop surface when the first and second filter elements 402, 404 are compressed against each other.

While either one of the first open end cap 412 or second open end cap 422 can include the projection 444 or receiver 446, in the particular example shown in the drawings, the first open end cap 412 includes the projection 444. In the example shown, the projection 444 includes an arcuate projection member 448 (FIG. 30). The arcuate projection member 448 extends over a distance, i.e., a radial length of the first open end cap 412. As can be seen in FIG. 30, in this example, the arcuate projection member 448 extends at least 50% of the radial length of the first open end cap 412.

Figure 26:
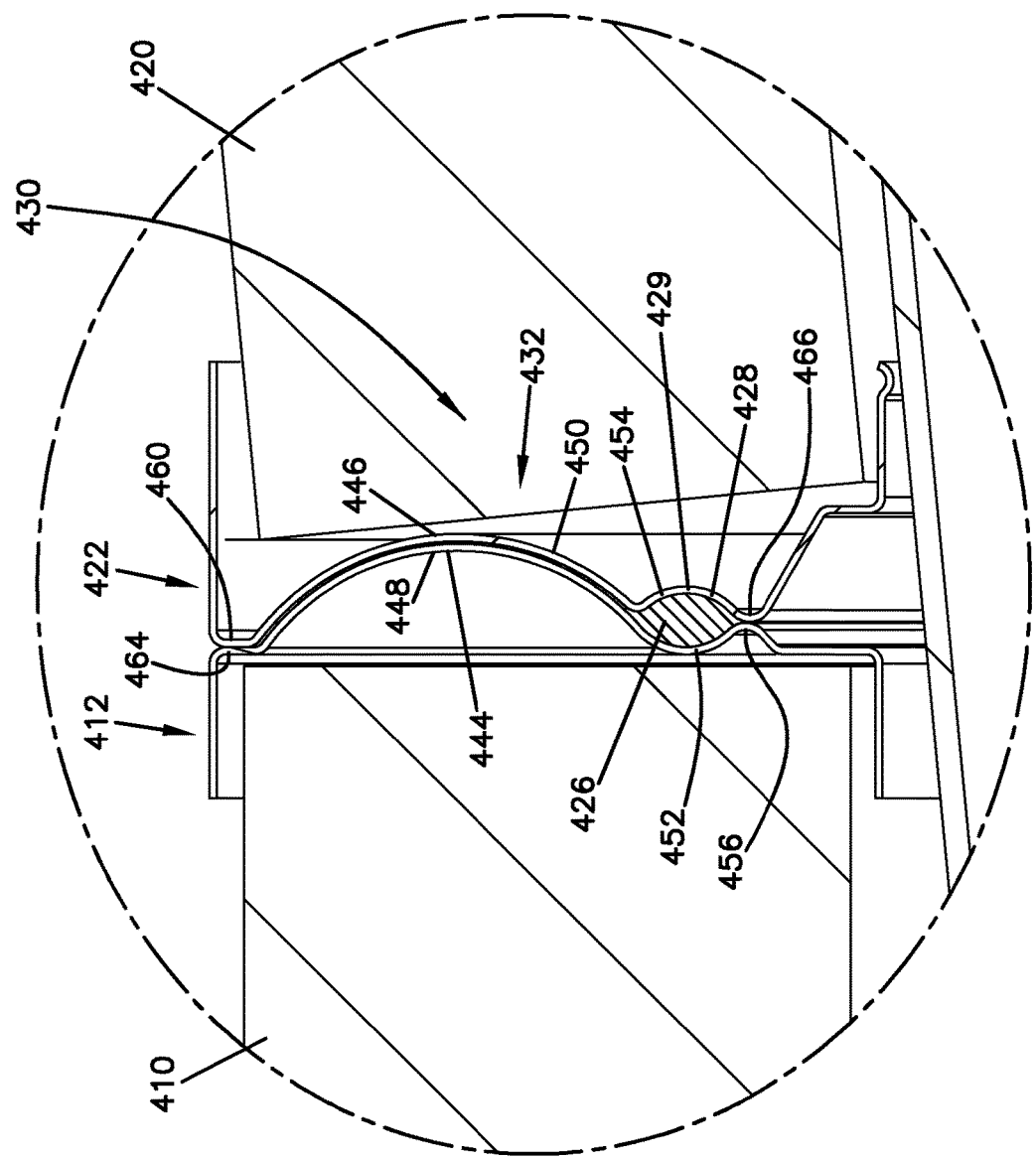
FIG. 26 is an enlarged cross-sectional view of section A of FIG. 25.

In the example shown, the receiver 446 is part of the second open end cap 422. In the example shown in FIG. 33, the receiver 446 includes an arcuate dish 450 that is sized to receive the arcuate projection member 448. Many embodiments are possible. In the one shown in FIG. 33, the arcuate dish 450 extends at least 50% of the radial length of the second open end cap 422. FIG. 26 illustrates the arcuate projection member 448 received by the arcuate dish 450 with the projecting gasket 426 being compressed between the first open end cap 412 and second open end cap 422 and forming seal 429 therebetween.

One of the first open end caps 412 and second open end cap 422 has a cup 452, and the other has a groove 454. The cup 452 is for holding the projecting gasket 426. In the example embodiment shown, the cup 452 (FIG. 30) is part of the first open end cap 412. The groove 454 includes the gasket-receiving surface 428 and is oriented in size to receive and engage the projecting gasket 426. In this example shown, the cup 452 is part of the first open end cap 412, and the groove 454 is part of the second open end cap 422.

Attention is directed to FIG. 30. While many variations are possible, in the embodiment shown, the first open end cap 412 has the cup 452 oriented adjacent to the arcuate projection member 448.

Still in reference to FIG. 30, adjacent to the cup 452 on a side opposite of the arcuate projection member 448 is a first minor projection member 456. The first projection member 456 is smaller in height than the arcuate projection member 448, which is why it is referred to as a "minor" projection member 456. The first minor projection member 456 will engage a corresponding member on the second open end cap 422 as part of the end stop arrangement 430.

Still in reference to FIG. 30, it can be seen how the arcuate projection member 448 is positioned radially further from the interior volume 458 (FIG. 25), than the cup 452. That is, in this embodiment, the first end cap 412 has at its outmost radial point an outer landing 460. The outer landing 460 is generally straight or flat. Moving radially inwardly from the outer landing 460 is the arcuate projection member 448. Moving radially inwardly from the arcuate projection member 448 is the cup 452. Moving radially inwardly from the cup 452 is the first minor projection member 456. Moving radially inwardly from the first minor projection member 456, and at its most radially inward point, is an inner landing 462. The inner landing 462 is generally straight and flat.

Many different sizes and embodiments are possible. In one example, the arcuate projection member 448 has a height, when measured from the outer landing 460 of at least 5 mm, not greater than 15 mm, for example about 7-10 mm. The arcuate projection member 448 is on a radius of at least 10 degrees, not greater than 40 degrees, for example about 15-25 degrees. The height of the first minor projection member 456, measured from the outer landing 460 is typically at least 20% of the height of the arcuate projecting member 448, not greater than 50% of the height of the arcuate projecting member 448, typically about 30-40% of the arcuate projecting member 448. It can have a height of at least 1 mm, not greater than 5 mm, for example 2-4 mm.

Attention is directed to FIG. 33, showing a portion of the second end cap 422. The second open end cap 422 has the groove 454 oriented adjacent to the arcuate dish 450. The arcuate dish 450 is positioned radially further from the interior volume 458 (FIG. 25) then the groove 454.

While many embodiments are possible, in the example shown in FIG. 33, the second end cap 422 includes along its most outwardly radially point an outer landing 464. The outer landing 464 is the greatest in height of any other structure on the second open end cap 422. Radially inwardly of the outer landing 464 is the arcuate dish 450. Radially inwardly and adjacent to the arcuate dish 450 is the groove 454. The groove 454 is between a second minor projection member 466 and a third minor projection member 467. The third minor projection member 467 is immediately adjacent to the arcuate dish 450 and is between the groove 454 and the arcuate dish 450. Radially inwardly and adjacent to the groove 454 is the second minor projection member 466. The second minor projection member 466 engages against the first minor projection member 456 on the first open end cap 412, to form a portion of the end stop arrangement 430. Radially inwardly and adjacent to the second minor projection member 466 is a ramp 468 extending downwardly and away from the second minor projection member 466 in a direction toward the interior volume 458. At the base of the ramp 468 and radially inwardly of the ramp 468 is an inner landing 470, which is also at the radially most inward point of the second open end cap 422.

Many variations of sizes can be used. Typical useful arrangements include the outer landing 464 having a height that is at least 5 mm, no greater than 15 mm, for example 7-10 mm from a lower-most point 472 of the arcuate dish 450. The radius of the arcuate dish 450 will typically be about the same as the radius of the arcuate projection member 448, i.e., on a radius of at least 10 degrees, not greater than 40 degrees, for example about 15-25 degrees. The height of the second minor projection member 466 is at least 1 mm, no greater than 7 mm, typically 2-4 mm when measured from the height of the outer landing 464. The third minor projection member 467 is less than the height of the second minor projection member 466 by 0.5-2 mm. The ramp 468 is at an angle 474 relative to a surface perpendicular to the inner landing 470. The angle 474 is at least 15 degrees, not greater than 50 degrees, typically 20-40 degrees. The inner landing 470 also corresponds to a lowest point of the second open end cap 422. It is at least 8 mm, no greater than 15 mm, typically 10-12 mm lower than the height of the outer landing 464. It is at least 1 mm, not greater than 5 mm, typically 2-4 mm, lower than the lower-most point 472 of the arcuate dish 450.

In FIG. 26, it can be seen how when the first filter element 402 and second filter element 404 are operably mounted adjacent to each other, the arcuate extension member 448 is received by the arcuate dish 450, while the projecting gasket 426 is received within the groove 454. The first minor projection member 456 engages against the second minor projection member 466, along with engagement between the arcuate projection member 448 and arcuate dish 450 to form the end stop arrangement 430 and prevent over-compression of the projecting gasket 426. The outer landing 464 and the outer landing 460 also engage against each other, which can contribute to the end stop arrangement 430.

In referring, again, to FIG. 25, the second filter element 404 includes a third open end cap 476. The third open end cap 476 is located at an end 478 of the second filter element 404 opposite of the end 424 and the second open end cap 422. The third open end cap 476 holds a second projecting gasket 480. The second projecting gasket 480 is for forming a seal 482 (FIG. 27) with the tube sheet 406.

In preferred arrangements, the third open end cap 476 includes a second end stop arrangement 484. The second end stop arrangement 484 prevents over-compression of the second projecting gasket 480, responsive to a force compressing the second filter element 404 against the tube sheet 406.

Figure 36:
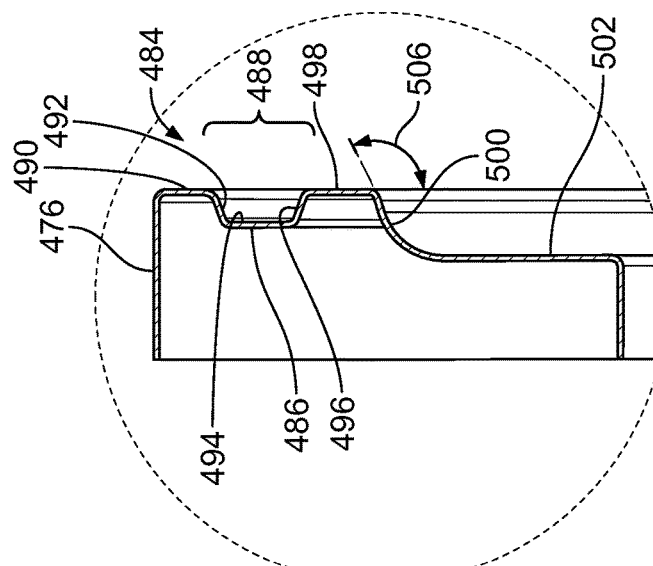
FIG. 36 is an enlarged view of section E of the end cap of FIG. 35.
Figure 35:
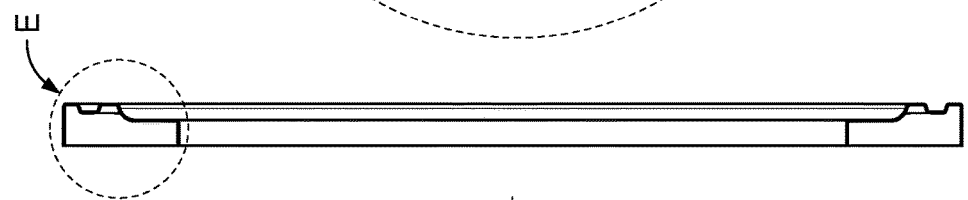
FIG. 35 is a cross-sectional view of the end cap of FIG. 34, the cross-section being taken along the line 35-35 of FIG. 34.
Figure 34:
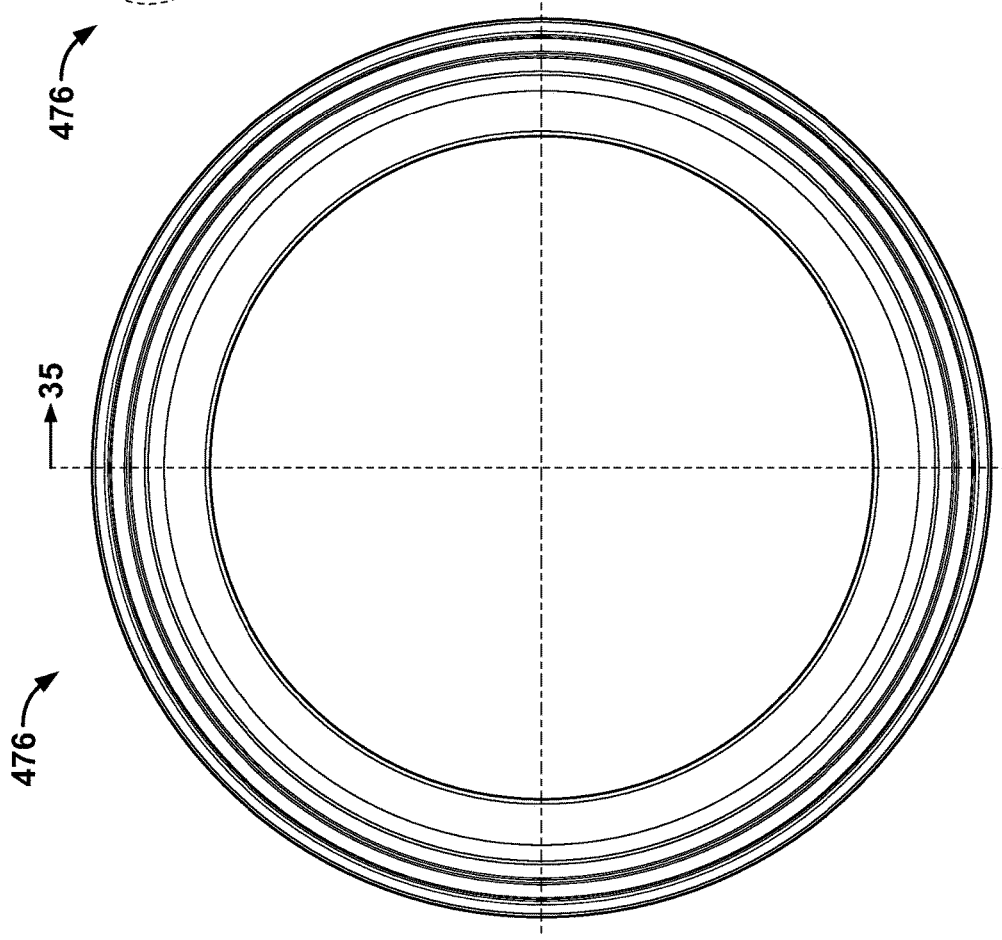
FIG. 34 is an end view of another of the end caps used in one of the filter elements of the filter assembly of FIG. 25.

Attention is directed to FIG. 36. The third open end cap 476 includes a trough 486. The trough 486 is recessed in a wall arrangement 488. The trough 486 holds the second projecting gasket 480 therewithin. The wall arrangement 488 includes the second end stop arrangement 484.

In the example shown, the wall arrangement 488 includes outer landing 490, which is at an outer-most radial portion of the third end cap 476. Radially inward of the outward landing 490 is a first wall surface 492 extending in a direction toward the media 420. Adjacent to the first wall surface 492 and radially inwardly thereof is the trough floor 494. Radially inwardly and adjacent to the trough floor 494 is the second wall surface 496 being angled relative to the trough floor 494. Adjacent to and radially inwardly of the second wall surface 496 is a second landing 498. The second landing 498 and the outer landing 490 are part of the wall arrangement 488 that forms the second end stop arrangement 484.

In the example shown in FIG. 27, the outer landing 490 and the second landing 498 engage against the tube sheet 406 to create a stop and to prevent over-compression of the second projecting gasket 480.

Still in reference to FIG. 36, extending radially inwardly from the second landing 498 is sloping surface 500, which is sloping downwardly and radially inwardly from the second landing 498. Radially inwardly of the sloping surface 500 is inner landing 502, which forms the lower-most portion of the third end cap 476.

Many sizes and arrangements are possible. In preferred examples, the height of the outer landing 490 and second landing 498, measured relative to the trough floor 494 is at least 2 mm, not greater than 10 mm, for example 3-5 mm. The width of the trough 486 across the trough floor 486 is at least 4 mm, not greater than 15 mm, for example 6-10 mm. The angle 506 of the sloping surface 500, when measured relative to the inner landing 502 is at least 90 degrees, not greater than 150 degrees, for example 100-130 degrees. The distance in height between the outer landing 490, second landing 498, and the inner landing 502 is at least 4 mm, not greater than 15 mm, for example 6-10 mm.

In FIG. 27, it can be seen how the second end stop arrangement 484 is engaged through abutment of the outer landing 490 and second landing 498 against the tube sheet 406. This stops further compression of the second projecting gasket 480. The inner landing 502, as compared to the height of the outer landing 490 and second landing 498 accommodates the head of a fastener 508 going through a portion of the yoke assembly 408 and the tube sheet 406. In FIG. 27, it can be seen that volume 510 between the inner landing 502 and the tube sheet 406 accommodates the head of the fastener 508.

Attention is again directed to FIG. 25. The assembly 400 in FIG. 25 can be appreciated as including the first filter element 402 and second filter element 404 secured together and secured against the tube sheet 406 using the yoke assembly 408. Seal 429 (FIG. 26) is formed between the engaging first open end cap 412, and second open end cap 422, with the end stop arrangement 430 preventing over-compression of the projecting gasket 426 by the force of the yoke assembly 408. Seal 482 (FIG. 27) is formed by compression of the second projecting gasket 480 against the tube sheet 406, while the second end stop arrangement 484 prevents over-compression of the second projecting gasket 480. The yoke assembly 408 can be seen in the interior volume 458 of the first and second filter elements 402, 404 compressing the first and second filter elements 402, 408 against each other and against the tube sheet 406.

A method of installing filter assembly 400 against tube sheet 406 can be followed, utilizing the above principles. The yoke assembly 408 will be secured to the tube sheet 406. The method includes mounting the first filter element 402 and second filter element 404 over the yoke assembly 408.

The filter elements 402, 404 can include at least some of the preferred structure as previously characterized. The method can include engaging the yoke assembly 408 to compress the projecting gasket 426 into the gasket-receiving surface 428 until the end stop arrangement 430 is engaged to prevent over-compression of the projecting gasket 426.

The step of mounting the first filter element 402 and second filter element 404 includes providing the second filter element 404 to include third open end cap 476. The third open end cap 476 includes second projecting gasket 480 and second end stop arrangement 484. The step of engaging the yoke includes compressing the second projecting gasket 480 against the tube sheet 406 until the second end stop arrangement 484 engages against the tube sheet 406 to prevent over-compression of the second projecting gasket 480.

The above description is examples of principles. Many embodiments can be made utilizing these principles.

What is claimed is:

1. A filter element comprising:
   (a) a tubular extension of filter media forming an open filter interior; and
   (b) a first end cap non-removably secured to the filter media, the first end cap having an aperture for receiving a yoke arrangement;
      (i) the first end cap being constructed and arranged to act as a spring when force is applied from the yoke arrangement; the first end cap including,
         a circular outer rim;
         a first flat section adjacent to the outer rim;
         an extending wall adjacent to the first flat section and extending into the open filter interior; the first flat section being between the extending wall and the outer rim; and
         a center section recessed relative to the wall as viewed from the filter interior, in an unstressed state, and attached to the extending wall with a rounded joint, the center section defining the aperture; wherein the center section includes a first surface extending from the rounded joint sloping in a direction away from the extending wall and toward the first flat section to a radiussed valley.

2. The filter element of claim 1 wherein the first end cap comprises steel.

3. The filter element of claim 1 further comprising a second, open end cap secured to the filter media at an end opposite of the first end cap.

4. A filter assembly comprising the filter element of claim 1, the filter element being a first filter element; the assembly further comprising:
   (a) a second filter element axially aligned with the first filter element;
   (b) a tube sheet; and
   (c) a yoke connecting the first filter element and second filter element together and to the tube sheet.

5. A spring end cap for use with a filter element; the end cap comprising:
   (a) a circular outer rim;
   (b) a first flat section adjacent to the outer rim;
   (c) an extending wall adjacent to the first flat section and extending into the open filter interior; the first flat section being between the extending wall and the outer rim; and
   (d) a center section recessed relative to the wall as viewed from the filter interior, in an unstressed state, and attached to the extending wall with a rounded joint, the center section defining the aperture;
      (i) wherein the center section includes a first surface extending from the rounded joint sloping in a direction away from the extending wall and toward the first flat section to a radiussed valley.

6. A filter element comprising:
   (a) a tubular extension of filter media forming an open filter interior; and
   (b) a first end cap non-removably secured to the filter media;
      (i) the first end cap being constructed and arranged to act as a spring when an external force is applied; wherein the first end cap includes,
         a circular outer rim;
         a first flat section adjacent to the outer rim;
         an extending wall adjacent to the first flat section and extending into the open filter interior; the first flat section being between the extending wall and the outer rim; and
         a center section recessed relative to the wall as viewed from the filter interior, in an unstressed state, and attached to the extending wall with a rounded joint; wherein the center section includes a first surface extending from the rounded joint sloping in a direction away from the extending wall and toward the first flat section to a radiussed valley.

7. The filter element of claim 6 further comprising a second, open end cap secured to the filter media at an end opposite of the first end cap.

8. A filter assembly comprising the filter element of claim 6, the filter element being a first filter element; the assembly further comprising:
   (a) a second filter element axially aligned with the first filter element;
   (b) a tube sheet; and
   (c) the first filter element and second filter element being connected together and to the tube sheet.

9. A filter element comprising:
   (a) a tubular extension of filter media forming an open filter interior; and
   (b) a first end cap secured to the filter media, the first end cap having an aperture for receiving a yoke arrangement; the first end cap being constructed and arranged to act as a spring when force is applied from the yoke arrangement; the first end cap including:
      (i) an outer rim;
      (ii) a first flat section adjacent to the outer rim;
      (iii) an extending wall adjacent to the first flat section and extending into the open filter interior; the first flat section being between the extending wall and the outer rim; and
      (iv) a center section recessed relative to the wall as viewed from the filter interior, in an unstressed state, and attached to the extending wall with a rounded joint, the center section defining the aperture;
         (A) the center section including a first surface extending from the rounded joint sloping in a direction away from extending wall and toward the first flat section to a radiussed valley.

10. The filter element of claim 9 wherein the first end cap comprises steel.

11. The filter element of claim 9 further comprising a second, open end cap secured to the filter media at an end opposite of the first end cap.

* * * * *